US010268953B1

(12) United States Patent
Fink et al.

(10) Patent No.: US 10,268,953 B1
(45) Date of Patent: Apr. 23, 2019

(54) DATA MINING TECHNIQUE WITH MAINTENANCE OF ANCESTRY COUNTS

(71) Applicant: SENTIENT TECHNOLOGIES (BARBADOS) LIMITED, Belleville (BB)

(72) Inventors: Daniel E. Fink, Berkeley, CA (US); Hormoz Shahrzad, Dublin, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 613 days.

(21) Appl. No.: 14/595,991

(22) Filed: Jan. 13, 2015

Related U.S. Application Data

(60) Provisional application No. 61/932,659, filed on Jan. 28, 2014.

(51) Int. Cl.
G06N 3/12 (2006.01)
G06N 5/02 (2006.01)

(52) U.S. Cl.
CPC ............. *G06N 3/126* (2013.01); *G06N 5/025* (2013.01)

(58) Field of Classification Search
None
See application file for complete search history.

(56) References Cited

U.S. PATENT DOCUMENTS

| 5,845,266 | A | 12/1998 | Lupien et al. |
| 5,920,848 | A | 7/1999 | Schutzer et al. |
| 6,240,399 | B1 | 5/2001 | Frank et al. |
| 6,249,783 | B1 | 6/2001 | Crone et al. |
| 7,013,344 | B2 | 3/2006 | Megiddo |
| 7,370,013 | B1 | 5/2008 | Aziz et al. |

(Continued)

FOREIGN PATENT DOCUMENTS

| EP | 2422276 A1 | 2/2012 |
| EP | 2422278 A1 | 2/2012 |

(Continued)

OTHER PUBLICATIONS

Hornby, The age-layered population structure (ALPS) evolutionary algorithm, GECCO'09, Jul. 8-12, 2009.*

(Continued)

*Primary Examiner* — Kakali Chaki
*Assistant Examiner* — Michael Zidanic
(74) *Attorney, Agent, or Firm* — Dawn-Marie Bey; Bey & Cotropia PLLC

(57) ABSTRACT

Roughly described, a computer-implemented evolutionary data mining system includes a memory storing a candidate gene database in which each candidate individual has a respective fitness estimate; a gene pool processor which tests individuals from the candidate gene pool on training data and updates the fitness estimate associated with the individuals in dependence upon the tests; and a gene harvesting module for deploying selected individuals from the gene pool, wherein the gene pool processor includes a competition module which selects individuals for discarding in dependence upon their updated fitness estimate. The system maintains the ancestry count for each of the candidate individuals, and may use this information to adjust the competition among the individuals, to adjust the selection of individuals for further procreation, and/or for other purposes.

28 Claims, 9 Drawing Sheets

(56) References Cited

U.S. PATENT DOCUMENTS

| | | | |
|---|---|---|---|
| 7,444,309 | B2 | 10/2008 | Branke et al. |
| 8,527,433 | B2 | 9/2013 | Hodjat et al. |
| 8,909,570 | B1 | 12/2014 | Hodjat et al. |
| 8,977,581 | B1 | 3/2015 | Hodjat et al. |
| 9,002,759 | B2 | 4/2015 | Hodjat et al. |
| 9,466,023 | B1 | 10/2016 | Shahrzad et al. |
| 2002/0019844 | A1 | 2/2002 | Kurowski et al. |
| 2002/0080169 | A1* | 6/2002 | Diederiks ............... H04N 7/163 715/744 |
| 2004/0210545 | A1 | 10/2004 | Branke et al. |
| 2004/0254901 | A1 | 12/2004 | Bonabeau et al. |
| 2005/0033672 | A1 | 2/2005 | Lasry et al. |
| 2005/0187848 | A1 | 8/2005 | Bonissone et al. |
| 2005/0198103 | A1 | 9/2005 | Ching |
| 2007/0143198 | A1 | 6/2007 | Brandes et al. |
| 2007/0143759 | A1 | 6/2007 | Ozgur et al. |
| 2007/0185990 | A1 | 8/2007 | Ono et al. |
| 2008/0071588 | A1 | 3/2008 | Eder |
| 2008/0228644 | A1 | 9/2008 | Birkestrand et al. |
| 2009/0125370 | A1 | 5/2009 | Blondeau et al. |
| 2009/0307638 | A1 | 12/2009 | McConaghy |
| 2010/0030720 | A1 | 2/2010 | Stephens |
| 2010/0182935 | A1 | 7/2010 | David |
| 2010/0274736 | A1* | 10/2010 | Hodjat .................... G06N 3/126 705/36 R |
| 2010/0274742 | A1 | 10/2010 | Hodjat et al. |
| 2010/0293119 | A1 | 11/2010 | Ferringer et al. |
| 2011/0161264 | A1 | 6/2011 | Cantin |
| 2011/0246834 | A1 | 10/2011 | Rajashekara et al. |
| 2012/0239517 | A1 | 9/2012 | Blondeau et al. |
| 2013/0124440 | A1 | 5/2013 | Hodjat et al. |
| 2013/0254142 | A1 | 9/2013 | Hodjat et al. |
| 2014/0006316 | A1 | 1/2014 | Hodjat et al. |
| 2016/0283563 | A1 | 9/2016 | Hodjat et al. |

FOREIGN PATENT DOCUMENTS

| | | |
|---|---|---|
| JP | 08-110804 A | 4/1996 |
| JP | 2001325041 A | 11/2001 |
| JP | 2003044665 A | 2/2003 |
| JP | 2004240671 A | 8/2004 |
| JP | 2004302741 A | 10/2004 |
| JP | 2007207173 A | 8/2007 |
| JP | 2007522547 A | 8/2007 |
| WO | 2005073854 A2 | 8/2005 |
| WO | 2010127039 A1 | 11/2010 |
| WO | 2010127042 A1 | 11/2010 |

OTHER PUBLICATIONS

Laumanns, Marco et al.; "A Unified Model for Multi-Objective Evolutionary Algorithms with Elitism"; 2000; IEEE; pp. 46-53.

Ahn, Chang Wook et al.; "Elitism-Based Compact Genetic Algorithms"; 2003; IEEE; Transactions on Evolutionary Computation, vol. 7, No. 4; pp. 367-385.

U.S. Appl. No. 13/540,507—Notice of Allowance, dated Oct. 31, 2014, 9 pages.

Deliberately left blank.

Hornby, G.S., "ALPS: The Age-Layered Population Structure for Reducing the Problem of Premature Convergence," GECCO'06, Seattle, Jul. 2006, authored by an employee of the US Government, therefore in the public domain, 8pp.

Hornby, G.S., "A Steady-State Version of the Age-Layered Population Structure EA," Chapter 1 of Genetic Programming Theory and Practice VII, Riolo et al., editors, Springer 2009, 16pp.

Hornby, G.S., "Steady-State ALPS for Real-Valued Problems," GECCO'09, Montreal, Jul. 2009, Assoc. for Computing Machinery, 8pp.

Idesign lab, "ALPS—the Age-Layered Population Structure," UC Santa Cruz web article printed Mar. 17, 2011, 3 pp. (http://idesign.ucsc.edu/projects/alps.html).

U.S. Appl. No. 13/358,381—Notice of Allowance, dated Nov. 19, 2014, 5 pages.

Laumanns, Marco et al.; "A Unified Model for Multi-Objective Evolutionary Aigorithms with Elitism"; 2000; IEEE; pp. 46-53.

Ahn, Chang Wook et al.; "Elitism-Based Compact Genetic Aigorithms"; 2003; IEEE; Transactions on Evolutionary Computation, vol. 7, No. 4; pp. 367-385.

Gaspar-Cunha, A. et al., "A Multi-Objective Evolutionary Algorithm Using Neural Networks to Approximate Fitness Evaluations," Int'l J. Computers, Systems and Signals, 6(1) 2005, pp. 18-36.

Kosorukoff, A. "Using incremental evaluation and adaptive choice of operators in a genetic algorithm," Proc. Genetic and Evolutionary Computation Conference, GECCO—Sep. 2002, 7pp.

Nelson, A. "Fitness functions in evolutionary robotics: A survey and analysis," Robotics and Autonomous Systems 57 (Apr. 30, 2009) 345-370.

Bongard, J. C. et al., "Guarding Against Premature Convergence while Accelerating Evolutionary Search", GECCO'10: Proceedings of the 12th annual conference on Genetic and Evolutionary Computation, 8 pages (2010).

Wu, A.S. et al., "An incremental fitness function for partitioning parallel taks," Proc. Genetic and Evolutionary Computation Conf. (Aug. 2001) 8pp.

Whitehead, B.A. "Genetic Evolution of Radial Basis Function Coverage Using Orthogonal Niches," IEEE Transactions on Neural Networks, 7:6, (Nov. 1996) 1525-28.

Bui L.T. et al., "Local models: An approach to distributed multi-objective optimization," Computational Optimization and Applications, vol. 42, No. 1, Oct. 2007, pp. 105-139.

Castillo Tapia M.G. et al., "Applications of multi-objective evolutionary algorithms in economics and finance: A survey," Proc. IEEE Congress on Evolutionary Computation, Sep. 2007, pp. 532-539.

Ducheyne, E. et al., "Is Fitness Inheritance Useful for Real-World Applications?" Evolutionary Multi-Criterion Optimization, ser. LNCS 2631, Spring 2003, pp. 31-42.

Enee, Gilles et al., "Classifier Systems Evolving Multi-Agent System with Distributed Elitism," Proc. 1999 Congress on Evolutionary Computation (CEC'99) vol. 3:Jul. 6, 1999, pp. 1740-1746.

Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.

Juille, H. "Evolution of Non-Deterministic Incremental Algorithms as a New Approach for Search in State Spaces," Proc. 6th Int'l Conf. on Genetic Algorithms, 1995, 8pp.

International Search Report dated Jul. 2, 2010 in PCT/US10/32847.

International Search Report dated Jun. 29, 2010 in PCT/US10/32841.

Sacks, J. et al. "Design and Analysis of Computer Experiments," Statistical Science 4:4, 1989, 409-435.

Torresen, J. "A Dynamic Fitness Function Applied to Improve the Generalisation when Evolving a Signal Processing Hardware Architecture," Proc. EvoWorkshops 2002, 267-299 (12 pp).

Bartlett II, J.E. et al., "Organizational Research: Determining Appropriate Sample Size in Survey Research," IT, Learning, and Performance Journal 19(1) Spring 2001, 8pp.

Fitzpatrick, J.M. et al., "Genetic Algorithms in Noisy Environments," Machine Learning 3: 101-120, May 1988.

JP 2010-533295, Office Action dated Apr. 16, 2013, English language translation, 3 pages.

Koza, J.R., "Genetic Programming: On the Programming of Computers by Means of Natural Selection", Dec. 1992, MIT Press, pp. 1-609.

León C. et al., "Parallel hypervolume-guided hyperheuristic for adapting the multi-objective evolutionary island model," Proc. 3rd Int'l Workshop on Nature Inspired Cooperative Strategies for Optimization Studies in Computational Intelligence, vol. 236, Nov. 2008, pp. 261-272.

López Jaimes A. et al., "MRMOGA: Parallel evolutionary multiobjective optimization using multiple resolutions," Proc. IEEE Congress on Evolutionary Computation, vol. 3, Sep. 2005, pp. 2294-2301.

(56) References Cited

OTHER PUBLICATIONS

Davarynejad, M. et al., "A Novel General Framework for Evolutionary Optimization: Adaptive Fuzzy Fitness Granulation," CEC Sep. 2007, 6pp.

Davarynejad, M. "Fuzzy Fitness Granulation in Evolutionary Algorithms for complex optimization," Master of Science Thesis, Ferdowsi Univ. of Mashhad, Jun. 2007, 30pp.

Salami, M. et al., "A fast evaluation strategy for evolutionary algorithms," Applied Soft Computing 2/3F (Jan. 2003) 156-173.

M.-R Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, Jul. 2003, pp. 61-66.

Mouret, J.B. et al., "Encouraging Behavioral Diversity in Evolutionary Robotics: An Empirical Study," MIT, Evolutionary Computation 20(1):91-133, 2012.

Myers, Raymond H. and Montgomery, Douglas C., Response Surface Methodology: Process and Product Optimization Using Designed Experiments, John Wiley and Sons, Inc., New York, 1995.

Poli R et al., "Genetic Programmig: An introductory Tutorial and a Survey of Techniques and Applications," Univ. Essex School of Computer Science and Eletronic Engineering Technical Report No. CES-475, Oct. 2007, 112 pp.

Georgilakis, P.S. "Genetic Algorithm Model for Profit Maximization of Generating Companies in Deregulated Electricity Markets," Applied Artificial Intelligence, Jul. 2009, 23:6,538-552.

Refaeilzadeh, P. et al., "Cross Validation" entry, Encyclopedia of Database Systems, eds. Özsu and Liu, Springer, 2009, 6pp.

Remde, S. et al. "Evolution of Fitness Functions to Improve Heuristic Performance," LION Dec. 8-10, 2007 II, LNCS 5313 pp. 206-219.

Sakauchi et al., UNIFINE: A Next Generation Financial Solution System of Nihon Unisys Ltd., Technology Review 'UNISYS,' Japan, Nihon Unisys Ltd., Feb. 28, 2006, vol. 25, No. 4, 5 pages.

Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, Sep. 20-24, 2004, pp. 421-424.

Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/Introduction to E volutionary Algorithms.pdf).

Tanev, I. et al., "Scalable architecture for parallel distributed implementation of genetic programming on network of workstations," J. Systems Architecture, vol. 47, Jul. 2001, pp. 557-572.

U.S. Appl. No. 13/184,307—Office Action dated Oct. 21, 2013, 16 pages.

Hornby, Gregory S.,"The Age-Layered Population Structure (ALPS) Evolutionary Algorithm," ACM; GECCO Jul. 8-12, 2009; 7 pages.

U.S. Appl. No. 13/358,381—Office Action dated Jul. 8, 2014, 30 pages.

Freitas, A., "A review of evolutionary algorithms for data mining." Soft Computing for Knowledge Discovery and Data Mining, Springer US, 2008, pp. 79-111.

U.S. Appl. No. 13/540,507—Office Action dated Sep. 9, 2014, 25 pages.

U.S. Appl. No. 13/184,307—Notice of Allowance dated Aug. 4, 2014, 9 pages.

U.S. Appl. No. 13/184,307—Office Action dated Mar. 21, 2014, 36 pages.

Hodjat, B., et al., "Introducing an Age-Varying Fitness Estimation Function," Genetic Finance, Chapter 5, Genetic Programming Theory and Practice, Springer Science+Business Media New York, Copyright 2013, pp. 59-71.

Hodjat et. al., "nPool: Massively Distributed Simultaneous Evolution and Cross-Validation in EC-Star," Sentient Technologies, May 2015, pp. 1-12.

Al-Haj Baddar, "Finding Better Sorting Networks," Dissertation to Kent State University for PhD, May 2009, 86 pages.

Cuccu et al., "When Novelty is Not Enough," vol. 6624 in Lecture Notes in Computer Science, published in Applications of Evolutionary Computation, Springer-Verlag Berlin Heidelberg, Copyright 2011, pp. 234-243.

Gomes et al., "Devising Effective Novelty Search Algorithms: A Comprehensive Empirical Study," Madrid, Spain, Copyright Jul. 11-15, 2015, ACM, 8 pages.

Gomes et al., "Evolution of Swarm Robotics Systems with Novelty Search," published in Swarm Intelligence, vol. 7, Issue 2, ANTS Special Issue, Copyright Sep. 2013, pp. 115-144.

Gomes et al., "Progressive Minimal Criteria Novelty Search," Lisboa, Portugal, cited in Advances in Artificial Intelligence, Springer-Verlag Berlin Heidelberg, Copyright 2012, pp. 281-290.

Gupta et al., "An Overview of methods maintaining Diversity in Generic Algorithms," International Journal of Emerging Technology and Advanced Engineering, vol. 2, Issue 5, New Delhi, India, May 2012, pp. 56-60.

Hodjat et al, "Maintenance of a Long Running Distributed Genetic Programming System for Solving Problems Requiring Big Data," Genetic Finance Chap 1, published in Genetic Programming Theory and Practice XI as Chapter 4, Copyright 2014, 20 pages.

Kipfer et al., "UverFlow: A GPU-Based Particle Engine," Computer Graphics and Visualization, The Eurographics Association, Copyright 2004, 9 pages.

Krcah et al., "Combination of Novelty Search and Fitness-Based Search Applied to Robot Body-Brain Co-Evolution," Charles University, Prague Czech Republic, in Proceedings of the 13th Czech-Japan Seminar on Data Analysis and Decision Making in Service Science, 2010, 6 pages.

Lehman et al., "Abandoning Objectives: Evolution through the Search for Novelty Alone," Evolutionary Computation journal, MIT Press, Copyright 2011, pp. 189-223.

Lehman et al., "Efficiently Evolving Programs through the Search for Novelty," Proceedings of the Genetic and Evolutionary Computation Conference, ACM New York NY, Copyright 2010, 8 pages.

Lehman et al., "Evolving a Diversity of Creatures through Novelty Search and Local Competition," Proceedings of the Genetic and Evolutionary Computation Conference, ACM, Copyright 2011, 8 pages.

Lehman et al., "Extinction Events Can Accelerate Evolution," PLOS ONE, journal.pone.0132886, Aug. 12, 2015, 16 pages.

Lehman et al., "Overcoming Deception in Evolution of Cognitive Behaviors," University of Texas at Austin, ACM, Jul. 12-16, 2014, 8 pages.

Lehman et al., "Revising the Evolutionary Computation Abstraction: Minimal Criteria Novelty Search," Proceedings of the Genetic and Evolutionary Computation Conference, ACM, Copyright 2010, 8 pages.

Mouret et al., "Encouraging Behavioral Diversity in Evolutionary Robotics: An Empirical Study," Massachusettes Institute of Technology, Copyright 2012, Evolutionary Computation 20(1), pp. 91-133.

Oreilly, U., et al., "EC-Star: A Massive-Scale, HUB and Spoke, Distributed Genetic Programming System," Evolutionary Design and Optimization Group, published in Genetic Programming and Theory X as Chapter 6, published in V as Chap 1, Springer New York, Copyright 2013, 14 pages.

Salge, C., et al., "Empowerment—An Introduction," published in Guided Self-Organization: Inception, Chap 4, University of Hertfordshire, Copyright 2014, pp. 67-114.

Secretan, J., et al., "Picbreeder: A Case Study in Collaborative Evolutionary Exploration of Design Space," Evolutionary Computation journal, MIT Press, Copyright 2011, 30 pages.

Shahrzad, H., et al., "Tackling the Boolean Multiplexer Function Using a Highly Distributed Genetic Programming System," published in Genetic Programming Theory and Practice XII, Springer International Publishing, Copyright 2015, pp. 167-179.

Valsalam, V.K., et al., "Using Symmetry and Evolutionary Search to Minimize Sorting Networks," Journal of Machine Learning Research 14, The University of Texas at Austin, Department of Computer Science, Copyright Sep. 2013, pp. 303-331.

(56) References Cited

OTHER PUBLICATIONS

Wissner-Gross, et al., "Causal Entropic Forces," Physical Review Letters, PRL 110.168702, American Physical Society, Apr. 19, 2013, 5 pages.

\* cited by examiner

INDIVIDUAL 310

| | INDIVIDUAL ID | EXPERIENCE | FITNESS | ANCESTRY COUNT | |
|---|---|---|---|---|---|
| | 312 | 314 | 316 | | 324 |
| RULE 1 | P/V 1.1 | P/V 1.2 | ... | P/V 1.M | OUTPUT 1 |
| RULE 2 | P/V 2.1 | P/V 2.2 | ... | P/V 2.M | OUTPUT 2 |
| RULE 3 | P/V 3.1 | P/V 3.2 | ... | P/V 3.M | OUTPUT 3 |
| RULE 4 | P/V 4.1 | P/V 4.2 | ... | P/V 4.M | OUTPUT 4 |
| RULE 5 | P/V 5.1 | P/V 5.2 | ... | P/V 5.M | OUTPUT 5 |

TRAINING DATA 114

| DATE | SECURITY |
|---|---|
| Raw market data for entire day, e.g. tick data, trading volume data, price, etc.; and all other data needed to test performance of the individual on this security on this historical trading day | |

| DATE | SECURITY |
|---|---|
| Raw market data for entire day, e.g. tick data, trading volume data, price, etc.; and all other data needed to test performance of the individual on this security on this historical trading day | |

| DATE | SECURITY |
|---|---|
| Raw market data for entire day, e.g. tick data, trading volume data, price, etc.; and all other data needed to test performance of the individual on this security on this historical trading day | |

DATA MINING TECHNIQUE WITH MAINTENANCE OF ANCESTRY COUNTS

CROSS-REFERENCE TO OTHER APPLICATIONS

This application claims priority to U.S. Provisional Application No. 61/932,659, filed 28 Jan. 2014, by Daniel E. Fink and Hormoz Shahrzad, which application is incorporated by reference herein.

This application also relates to U.S. patent application Ser. No. 13/184,307, filed 15 Jul. 2011, entitled "DATA MINING TECHNIQUE WITH EXPERIENCE-LAYERED GENE POOL," by Babak Hodjat, Hormoz Shahrzad and Greg S. Hornby, which application is incorporated by reference herein.

BACKGROUND

The invention relates generally to data mining, and more particularly, to the use of genetic algorithms to extract useful rules or relationships from a data set for use in controlling systems.

In many environments, a large amount of data can be or has been collected which records experience over time within the environment. For example, a healthcare environment may record clinical data, diagnoses and treatment regimens for a large number of patients, as well as outcomes. A business environment may record customer information such as who they are and what they do, and their browsing and purchasing histories. A computer security environment may record a large number of software code examples that have been found to be malicious. A financial asset trading environment may record historical price trends and related statistics about numerous financial assets (e.g., securities, indices, currencies) over a long period of time. Despite the large quantities of such data, or perhaps because of it, deriving useful knowledge from such data stores can be a daunting task.

The process of extracting patterns from such data sets is known as data mining. Many techniques have been applied to the problem, but the present discussion concerns a class of techniques known as genetic algorithms. Genetic algorithms have been applied to all of the above-mentioned environments. With respect to stock categorization, for example, according to one theory, at any given time, 5% of stocks follow a trend. Genetic algorithms are thus sometimes used, with some success, to categorize a stock as following or not following a trend.

Evolutionary algorithms, which are supersets of Genetic Algorithms, are good at traversing chaotic search spaces. According to Koza, J. R., "Genetic Programming: On the Programming of Computers by Means of Natural Selection", MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and actions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

A common problem with evolutionary algorithms is that of premature convergence: after some number of evaluations the population converges to local optima and no further improvements are made no matter how much longer the algorithm is run. In one of a number of solutions to this problem, known as the Age-Layered Population Structure (ALPS), an individual's age is used to restrict competition and breeding between individuals in the population. In the parlance of ALPS, "age" is a measure of the number of times that an individual's genetic material has survived a generation (i.e., the number of times it has been preserved due to being selected into the elitist pool).

When using genetic algorithms to mine a large database, it may not be practical to test each individual against the entire database. The system therefore rarely if ever knows the true fitness of any individual. Rather, it knows only an estimate of the true fitness, based on the particular subset of data samples on which it has actually been tested. The fitness estimate itself therefore varies over time as the individual is tested on an increasing number of samples. It is in this kind of environment that embodiments of the present invention reside.

SUMMARY

In the above-incorporated "DATA MINING TECHNIQUE WITH EXPERIENCE-LAYERED GENE POOL" application, a computer-implemented evolutionary data mining system includes a memory storing a candidate gene database in which each candidate individual has a respective fitness estimate; a gene pool processor which tests individuals from the candidate gene pool on training data, updates the fitness estimate associated with the individuals in dependence upon the tests, and performs procreation; and a gene harvesting module providing for deployment selected ones of the individuals from the gene pool, wherein the gene pool processor includes a competition module which selects individuals for discarding from the gene pool in dependence upon, among other things, their updated fitness estimate. Accommodations are made to account for the incompleteness of fitness testing of various individuals at the time they are competing with each other.

While this works well, Applicants have recognized that the results can be improved if the gene processing module were to also take into account the number of procreation events which occurred in the development of any particular individual. If individuals are initially created randomly, then the number of procreation events that occurred in the procreation history of a particular new individual (referred to generally herein as the individual's "ancestry count") in some sense indicates the amount of work that has already gone into refining the components of the individual. Such an individual is no longer random, and therefore it is reasonable to expect it to perform better than those that are.

The above observation can be used to great advantage in a number of ways. For example, since individuals with a higher ancestry count should be expected to perform better than those created randomly, in one embodiment the system handicaps the performance of individuals with higher ancestry count for purposes of the comparisons that take place in the competition module. The system may apply a handicap of a fixed percentage against individuals whose ancestry count exceeds a predetermined number of generations. Alternatively, the system may apply a handicap which varies non-decreasingly in magnitude as a function of ancestry count.

As another example, after an individual's ancestor count reaches a certain level, it might be reasonable to assume that it has already incorporated a particular behavior. For example, it might be reasonable to assume that such individuals have already incorporated simple behaviors. By including the ancestor count as a component of the fitness function, the competition module can begin selecting more specifically for more complex behaviors.

As another example, the mutation rate or other parameters of procreation are altered in dependence upon an individual's ancestry count. In one embodiment, the probability that a particular individual is selected for parenthood is altered in dependence upon the individual's ancestry count. The probability may be increased when it is desired to amplify the effects of greater ancestry count, or decreased when it is desired to attenuate the effects of greater ancestry count.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIG. 3 is a symbolic drawing of an individual in either the candidate gene pool or the production gene population of FIG. 1.

FIG. 4 is a symbolic drawing indicating how the training data database is organized.

DETAILED DESCRIPTION

Figure 1:
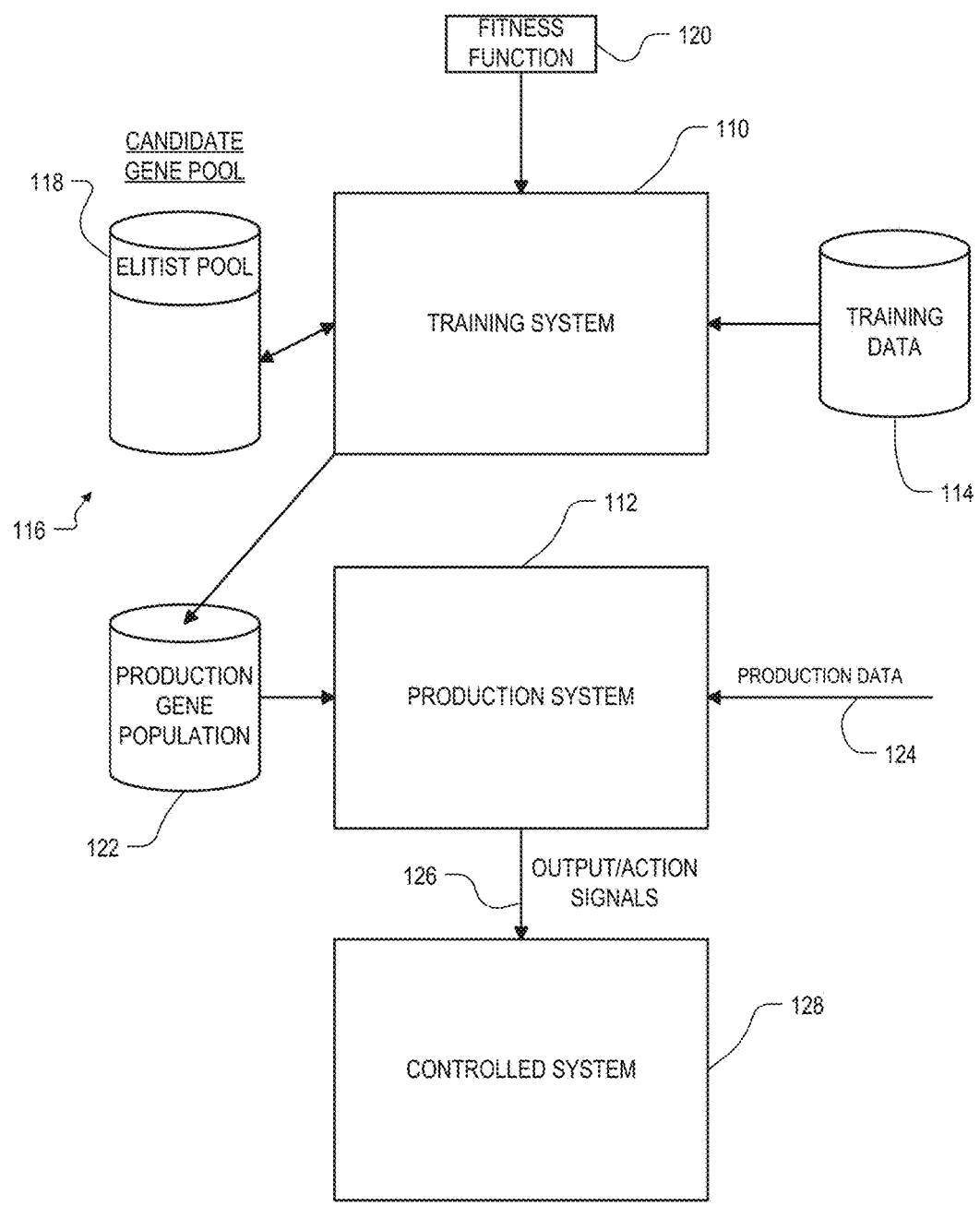
FIG. 1 is an overall diagram of an embodiment of a data mining system incorporating features of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data mining involves searching for patterns in a database. The fittest individuals are considered to be those that identify patterns in the database that optimize for some result. In embodiments herein, the database is a training database, and the result is also represented in some way in the database. Once fit individuals have been identified, they can be used to identify patterns in production data which are likely to produce the desired result. In a healthcare environment, the individual can be used to point out patterns in diagnosis and treatment data which should be studied more closely as likely either improving or degrading a patient's diagnosis. In a financial assets trading environment, the individual can be used to detect patterns in real time data and assert trading signals to a trading desk. The action signals from an individual can be transmitted to the appropriate controlled system for execution.

One difference between the data mining environments of the embodiments described herein, and many other environments in which evolutionary algorithms can be applied, is that the fitness of a particular individual in the data mining environment usually cannot be determined by a single test of the individual on the data; rather, the fitness estimation itself tends to vary as it is tested on more and more samples in the training database. The fitness estimate can be inaccurate as testing begins, and confidence in its accuracy increases as testing on more samples continues. This means that if an individual is "lucky" early on, in the sense that the first set of samples that it was given for testing happened to have been in some sense "easy", then after only the first set of samples the individual will appear to be fitter than it actually is. If compared to other individuals that have much more experience, lucky individuals could displace individuals whose fitness estimates are lower but more realistic. If care is not taken, therefore, the algorithm will optimize for individuals that are lucky early on, rather than their actual fitness.

A solution to this problem, implemented in certain embodiments described herein but not required for all embodiments of the present invention, is to consider individuals for the elitist pool only after they have completed testing on a predetermined number of samples, for example 1000 samples. Once an individual has reached that minimum threshold experience level, comparisons with other individuals are considered valid and can compete on the basis of fitness for a place in the elitist pool. Such competition can take account of each individual's ancestry count as described herein.

However, the argument that high fitness values of individuals with less experience and could be due to luck rather than true fitness, also applies, though to a lesser degree, even to individuals within the elitist pool. That is, if compared to other individuals that have much more experience, younger, luckier individuals that have already entered the elitist pool could still displace individuals whose fitness levels are lower but more realistic. Again, allowing such individuals to compete against each other solely on the basis of fitness would continue to optimize for individuals that are lucky. The same solution can be applied to avoid this problem: divide the elitist pool into two layers on the basis of experience level. For example, layer 1 ($L_1$) may include only those individuals that have been tested on 1000-1999 samples, while a layer 2 ($L_2$) includes all individuals that have been tested on 2000 or more samples. Individuals compete only against other individuals within the same experience layer.

It will be appreciated that the tendency to optimize for lucky individuals still remains, within each layer, though to a still lesser degree. A solution is again the same: add more layers until the tendency to optimize for lucky individuals is reduced to a level sufficiently small for the particular application. In the extreme, each layer contains only those individuals having a single experience level, meaning only individuals that have been tested on exactly the same number of samples can compete against each other. This extreme may not be practical, however, as it can require a large amount of memory to maintain. Thus for a particular application, there will be an appropriate number of layers which minimizes the tendency to optimize for lucky individuals, yet remains practical to implement.

In general, in embodiments herein, the elitist pool contains T layers numbered $L_1$-$L_T$, with T>1. The overall pool of candidate individuals also includes some that have not yet undergone sufficient numbers of tests to be considered for the elitist pool, and those individuals are considered herein to reside in a layer below the elitist pool, designed layer 0 ($L_0$). Each i'th one of the layers in [$L_0$ ... $L_{T-1}$] contains only individuals with a respective range of testing experience [ExpMin($L_i$) ... ExpMax($L_i$)], each ExpMin($L_{i+1}$)>ExpMax($L_i$). The minimum experience level of the bottom layer $L_0$ is 0, and the top layer $L_T$ has a minimum experience level ExpMin($L_T$) but no maximum experience level. Preferably, the experience ranges of contiguous layers are themselves contiguous, so that ExpMin($L_{i+1}$)=ExpMax($L_i$)+1, for 0<=i<T. Note that testing experience level is a significantly different basis on which to stratify individuals in an elitist pool than age in the sense of ALPS.

In an embodiment, each layer i in the elitist pool (i.e. in layers [$L_1$ ... $L_T$]) is permitted to hold a respective maximum number of individuals, Quota($L_i$). The quota is chosen to be small enough to ensure competition among the individuals within the corresponding range of experience levels, but large enough to ensure sufficient diversity among the fit individuals that graduate to the next higher layer. Preferably the quota of each such layer is fixed, but in another embodiment it could vary. The quota of layer $L_0$ is not chosen based on these criteria, since the individuals in that layer do not yet compete. Preferably the number of layers T in the elitist pool is also fixed, but in another embodiment it can vary.

As each individual gains more experience, assuming it is not displaced within its current experience layer, it will eventually graduate to the next higher experience layer. If the next higher experience layer is not yet full, then the individual is added to that layer. If it is full, then the individual has to compete for its place in that layer. If it is fitter than the least fit individual in that layer, it will be accepted into that layer and the least fit individual will be discarded. If not, then the graduating individual will be discarded and the individuals in the next higher layer will be retained.

Either way, a space is opened in the current experience layer (the layer from which the individual is graduating). The open space means that the next individual graduating into the current experience layer from below will be accepted without having to compete for its place—thereby defeating a purpose of the elitist pool. To mitigate this problem, an embodiment introduces the concept of an elitist pool minimum fitness, which in one embodiment is set to the minimum fitness of the top layer. The individuals in the top layer are assumed to have a relatively accurate estimate of their fitness, and since after the top layer is full the goal of the evolutionary algorithm is to identify individuals that are better than the ones already there, it makes sense to avoid devoting resources to individuals which already appear to be inferior. Thus in the embodiment, once the elitist pool minimum fitness is set, any individual being considered into the elitist pool can only be added if it has a fitness value above the elitist pool minimum fitness. Stated differently, once the top layer $L_T$ is full, individuals are not allowed to enter $L_1$ unless their fitness level is at least as high as the minimum fitness FitMin($L_T$) of the top layer $L_T$.

In an embodiment, the elitist pool minimum fitness is not established until the top layer is full. Otherwise, if the earliest entrants into the top layer happen to have excellent fitness, they will block other entrants which might be needed for diversity.

It will be appreciated that since the fitness estimate of individuals is still somewhat uncertain at the time they are being considered for entry into the elitist pool from $L_0$, establishing the minimum entry fitness at exactly FitMin($L_T$) may cull individuals that eventually would have been determined to have an actual fitness which exceeds FitMin($L_T$). In another embodiment, therefore, the minimum fitness for entry into the elitist pool is set at some other fitness level which is a function of FitMin($L_T$). For example, it can be set at 90% of FitMin($L_T$). It will also be appreciated that the accuracy of an individual's fitness estimate improves as the individual progresses up through the experience layers. Another embodiment, therefore, reduces the potential inaccuracy of the elitist pool minimum fitness test by applying it at the entry to one of the higher layers in the elitist pool, rather than at $L_0$. In yet another embodiment, the test is applied more than once, at the entry to more than one of the layers, or all of them. Other variations will be apparent. In general, in embodiments which attempt to cull unfit individuals early, individuals are discarded at the entry to at least one of the experience layers in the elitist pool, if their fitness estimate at that time is less than some function f( ) that depends at least on FitMin($L_T$). Note that the function f( ) need not necessarily be the same for all the layers at which the rule is applied.

Individuals that enter the top layer may themselves undergo further testing on samples in the training database. With such further experience, the fitness estimate of even those individuals may change. This can introduce a wave effect in the top layer due to fluctuations in fitness estimates of the individual with minimum fitness. This will, in turn, affect the elitist pool minimum fitness if the top layer is at quota. If the fitness estimate of the individual with the minimum fitness in the top layer decreases, then the minimum fitness of the top layer (and hence the entire elitist pool minimum fitness) will decrease. In order to prevent this, in one embodiment, individuals that have reached the top layer do not undergo further testing. The justification here is that individuals in the top layer are assumed to already have fitness estimates which are as representative as possible to their actual fitness. Such an embodiment accepts any remaining error in the fitness estimate because the likelihood that purely random variations at that point would exceed an error range already considered acceptable, is too large.

In one embodiment, individuals are harvested from the entire elitist pool for use against production data. In another embodiment, only individuals that have reached the top layer are subject to harvesting. In either embodiment, further selection criteria can be applied in the harvesting process. Such criteria is usually specific to the application environment, and can include, for example, both fitness as well as ancestry count.

Example Embodiment

FIG. 1 is an overall diagram of an embodiment of a data mining system incorporating features of the invention. The system is divided into three portions, a training system 110, a production system 112, and a controlled system 128. The training system 110 interacts with a database 114 containing training data, as well as with another database 116 containing the candidate gene pool. As used herein, the term "database" does not necessarily imply any unity of structure. For example, two or more separate databases, when considered together, still constitute a "database" as that term is used herein. The candidate gene pool database 116 includes a portion 118 containing the elitist pool. The training system 110 operates according to a fitness function 120, which indicates to the training system 110 how to measure the fitness of an individual. The training system 110 optimizes for individuals that have the greatest fitness, however fitness is defined by the fitness function 120. The fitness function is specific to the environment and goals of the particular application. For example, the fitness function may be a function of the predictive value of the individual as assessed against the training data—the more often the individual correctly predicts the result represented in the training data, the more fit the individual is considered. In a financial asset trading environment, an individual might provide trading signals (e.g. buy, sell, hold current position, exit current position), and fitness may be measured by the individual's ability to make a profit, or the ability to do so while maintaining stability, or some other desired property. In the healthcare domain, an individual might propose a diagnosis based on patient prior treatment and current vital signs, and fitness may be measured by the accuracy of that diagnosis as represented in the training data. As used herein, fitness may also include other target characteristics, such as diversity of candidate individuals.

The production system 112 operates according to a production gene population in another database 122. The production system 112 applies these individuals to production data 124, and produces outputs 126, which may be action signals or recommendations. In the financial asset trading environment, for example, the production data 124 may be a stream of real time stock prices and the outputs 126 of the production system 112 may be the trading signals or instructions that one or more of the individuals in production gene population 122 outputs in response to the production data 124. In the healthcare domain, the production data 124 may be current patient data, and the outputs 126 of the production system 112 may be a suggested diagnosis or treatment regimen that one or more of the individuals in production gene population 122 outputs in response to the production data 124. The production gene population 122 is harvested from the training system 110 once or at intervals, depending on the embodiment. Preferably, only individuals from elitist pool 118 are permitted to be harvested. In an embodiment, further selection criteria is applied in the harvesting process. Such further selection criteria may for example involve reference to the fitness trial histories of the individuals in the pool, and/or ancestry count.

The controlled system 128 is a system that is controlled automatically by the signals 126 from the production system. In the financial asset trading environment, for example, the controlled system may be a fully automated brokerage system which receives the trading signals via a computer network (not shown) and takes the indicated action. Depending on the application environment, the controlled system 128 may also include mechanical systems such as a engines, air-conditioners, refrigerators, electric motors, robots, milling equipment, construction equipment, or a manufacturing plant.

Figure 2:
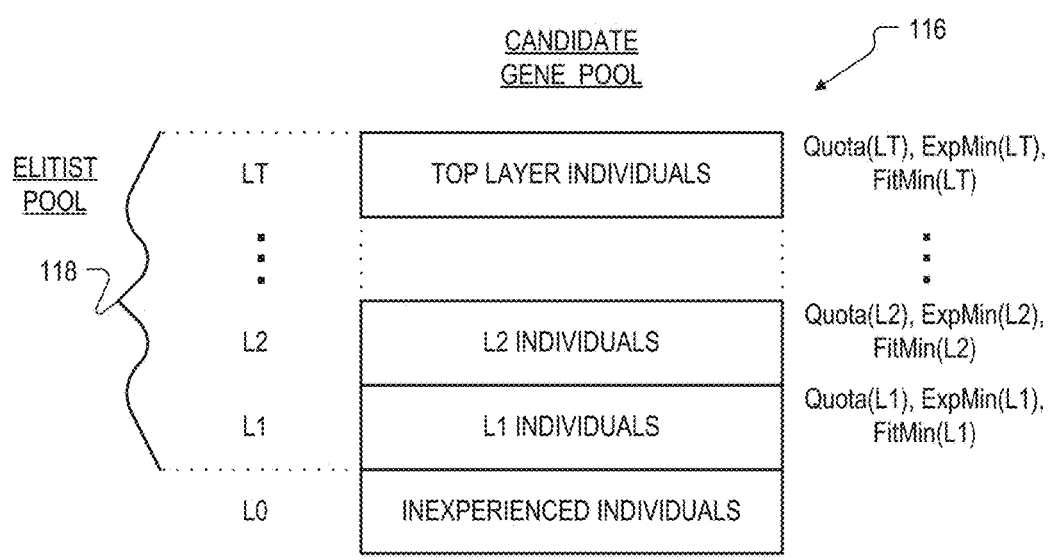
FIG. 2 is a symbolic drawing of the candidate gene pool in FIG. 1.

FIG. 2 is a symbolic drawing of the candidate gene pool 116 in FIG. 1. An "experience layered" elitist pool is used in the present embodiment, though aspects of the invention can be used in embodiments without experience layers, and indeed without an elitist pool. As can be seen in FIG. 2, the individuals in the pool are stratified into T+1 "experience layers", labeled $L_0$ through $L_T$. The individuals in $L_0$ are very inexperienced (have been tested on only a relatively small number of samples in training data 114, if any), whereas the higher layers contain individuals in successively greater experience ranges. The layers $L_1$ through $L_T$ constitute the elitist pool 118 (FIG. 1). Each layer i in the elitist pool 118 has associated therewith three "layer parameters": a quota $Quota(L_i)$ for the layer, a range of experience levels $[ExpMin(L_i) \ldots ExpMax(L_i)]$ for the layer, and the minimum fitness $FitMin(L_i)$ for the layer. For example, an embodiment in the financial asset trading environment may have on the order of 40 or 50 layers in the elitist pool, each containing individuals with experience levels within a range on the order of 4000-5000 trials. The minimum experience level $ExpMin(L_i)$ may be on the order of 8000-10,000 trials, and each layer may have a quota on the order of 100 individuals.

In the embodiment of FIG. 2, the quotas for all the layers in the elitist pool 118 are equal and fixed. Neither is required in another embodiment. In addition, $ExpMin(L_0)=0$ in this embodiment. Also, as the experience ranges of the layers are contiguous, ExpMin of each layer can be inferred as one higher than ExpMax of the next lower layer, or ExpMax of each layer can be inferred as one lower than ExpMin of the next higher layer. Thus only the minimum experience level or the maximum experience level need be specified for each layer. In the embodiment, only the minimum experience levels are specified, and they are specified for layers $L_1$-$L_T$; in another embodiment only the maximum experience levels are specified, and they are specified for layers $L_0$-$L_{T-1}$. In yet another embodiment, the size of the range of experience layers assigned to all the layers is constant, and only one minimum or maximum experience level is specified in the layer parameters; the remainder are calculated algorithmically as needed. Other variations will be apparent.

The FitMin( ) values in FIG. 2 are not specified a priori. Rather, they are filled by copying from the fitness estimate associated with the least fit individual in each layer. Whenever the fitness estimate of the least fit individual is updated, and whenever the least fit individual itself is replaced, the FitMin( ) value associated with the layer is updated correspondingly. The FitMin( ) values are needed for comparing to the fitness estimation of individuals coming up from the next lower layer, and having them associated directly with each layer can simplify this comparison. In another embodiment, each layer can instead contain a pointer to the least fit individual in the layer, and the comparison method can obtain the layer minimum fitness from that individual itself. In general, each layer has associated with it an "indication" of the minimum fitness in the layer. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication".

In one embodiment, the experience layer in candidate gene pool 116 define separate regions of memory, and the individuals having experience levels within the range of each particular layer are stored physically within that layer. Preferably, however, the experience layers are only implied by the layer parameters and the individuals can actually be located anywhere in memory. In one embodiment, the individuals in candidate gene pool 116 are stored and managed by conventional database management systems (DBMS), and are accessed using SQL statements. Thus a conventional SQL query can be used to obtain, for example, the fitness estimate of the least fit individual in the highest layer. New individuals can be inserted into the candidate gene pool 116 using the SQL "insert" statement, and individuals being discarded can be deleted using the SQL "delete" statement. In another embodiment, the individuals in candidate gene pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list.

FIG. 3 is a symbolic drawing of an individual 310 in either the candidate gene pool 116 or the production gene population 122. As used herein, an "individual" is defined by its contents. An individual created by procreation is considered herein to constitute a different individual than its parents, even though it retains some if its parents' genetic material. In this embodiment, the individual identifies an ID 312, its experience level 314, its current fitness estimate 316, and its ancestry count 324. It also includes one or more "rules" 318, each of which contains one or more conditions 320 and an output 322 to be asserted if all the conditions in a given sample are true. During procreation, any of the conditions or any of the outputs may be altered, or even entire rules may be replaced. The individual's experience level 314 increments by one for each sample of the training data 114 on which it is tested, and its overall fitness estimate 316 is determined by fitness function 120, averaged (or otherwise combined) over the all the trials.

As used herein, "ancestry count" is an indication of the number of procreation events that occurred in the procreation history of a particular new individual. It can be calculated by a number of different formulas, but in embodiments herein, each new individual formed by procreation is assigned an ancestor count equal to one plus the maximum ancestor count of its parent individual(s). A new individual created randomly is assigned an ancestor count of zero.

Also as used herein, a "result" is the combination of outputs produced by an individual in response to a single data sample (either during training or in production), and the "performance" of an individual is a measure of how good the "result" was on that single sample. "Experience" level is a count of the number of samples on which the individual has been tested, though in systems that discard duplicate tests, it is a count of the number of unique samples on which the individual has been tested. An individual's "average performance" is the average of the "performance" of the individual over all the samples counted in the individual's experience level, and it can be used directly as the overall fitness estimate of the individual in some embodiments. In other embodiments the overall fitness estimate can be weighted to favor or disfavor some characteristic, such as the individual's ancestry count as described herein.

A rule is a conjunctive list of indicator-based conditions in association with an output. Indicators are the system inputs that can be fed to a condition. These indicators are represented in the training database 114, as well as in the production data 124. Indicators can also be introspective, for example by indicating the fitness estimate of the individual at any given moment. In the embodiment of FIG. 1, the individual's conditions are all specified as parameter/value ("P/V") pairs. That is, if in the current sample, the specified parameter has the specified value (or range of values), then the condition is true. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent.

In a financial asset trading embodiment, during training, an individual can be thought of as a virtual trader that is given a hypothetical sum of money to trade using historical data. Such trades are performed in accordance with a set of rules that define the individual thereby prompting it to buy, sell, hold its position, or exit its position. The outputs of the rules are trading action signals or instructions, such as buy, sell, exit or hold. Rules may also be designed to contain gain-goal and stop-loss targets, thus rendering the exit action redundant. A hold occurs when no rule in the individual is triggered; therefore, the individual effectively holds its current position. The indicators on which the rules are based can be, for example, a time increment ("tick"), or the closing price for a stock day.

The following code defines an example rule in terms of conditions and indicators, as well as the action asserted by the rule, in accordance with one embodiment of the present invention:

if (PositionProfit>=2% and !(tick=(−54/10000)% prev tick and MACD is negative)
and !(tick=(−119/10000)% prev tick and Position is long))
and !(ADX×100<=5052))
then SELL where "and" represents logical "AND" operation, "!" represents logical "NOT" operation, "tick", "MACD" and "ADX" are stock indicators, "SELL" represents action to sell, and "PositionProfit" represents the profit position of the individual.

In a healthcare embodiment, an individual can be thought of as a set of rules predicting a patient's future state, given the patient's current and past state. The outputs of the rules can be proposed diagnoses or proposed treatment regimens that the individual asserts are appropriate given the conditions of the individual's rules. The indicators on which the rules are based can be a patient's vital signs, and past treatment and medication history, for example. An example rule is as follows:

if pulse>=120 and 18<=blood pressure[6]<20 and temp>=104 and surgery duration<22 and clamp on artery and medication=EB45 and last medication>=60 and !white blood cell count [3]<−2.3 and !oxygen level [1]<−1.1-->>> then thromboembolism @ prob<=0.65

The training data is arranged in the database 114 as a set of samples, each with parameters and their values, as well as sufficient information to determine a result that can be compared with an assertion made by an individual on the values in the sample. In one embodiment, the result is explicit, for example a number set out explicitly in association with the sample. In such an embodiment, the fitness function can be dependent upon the number of samples for which the individual's output matches the result of the sample. In another embodiment, such as in the financial asset trading embodiment, the result may be only implicit. For example, the sample may include the price of an asset at each tick throughout a trading day, and the training system 110 must hypothetically perform all the trading recommendations made by the individual throughout the trading day in order to determine whether and to what extent the individual made a profit or loss. The fitness function can be dependent upon the profit or loss that the individual, as a hypothetical trader, would have made using the tick data for the sample.

FIG. 4 is a symbolic drawing indicating how the training data is organized in the database 114. The illustration in FIG. 4 is for the financial asset trading embodiment, and it will be understood how it can be modified for use in other environments. Referring to FIG. 4, three samples 410 are shown. Each sample includes a historical date, an identification of a particular security or other financial asset (such as a particular stock symbol), and raw historical market data for that financial asset on that entire trading day, e.g. tick data, trading volume data, price, etc.; and all other data needed to test performance of the individual's trading recommendations on this asset on this historical trading day.

Figure 5:
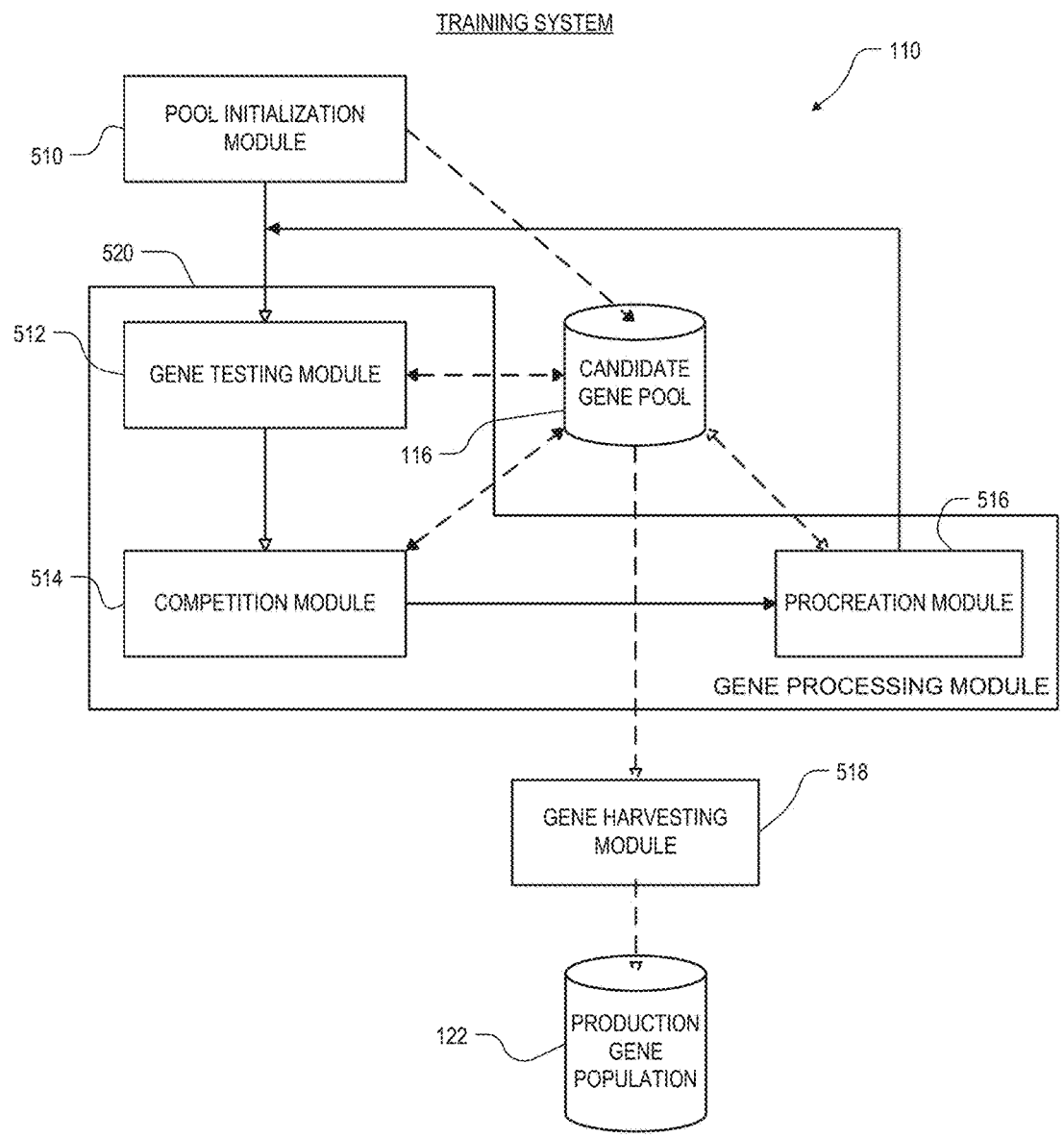
FIG. 5 illustrates modules that can be used to implement the functionality of the training system in FIG. 1.

FIG. 5 illustrates various modules that can be used to implement the functionality of training system 110 (FIG. 1). Candidate gene pool 116 and production gene population database 122 are also shown in the drawing. Solid lines indicate process flow, and broken lines indicate data flow. The modules can be implemented in hardware or software, and need not be divided up in precisely the same blocks as shown in FIG. 5. Some can also be implemented on different processors or computers, or spread among a number of different processors or computers. In addition, it will be appreciated that some of the modules can be combined, operated in parallel or in a different sequence than that shown in FIG. 5 without affecting the functions achieved. Also as used herein, the term "module" can include "sub-modules", which themselves can be considered herein to constitute modules. In particular, the gene testing module 512, competition module 514, and procreation module 516 are also considered herein to be sub-modules of a gene pool processor module 520. The blocks in FIG. 5 designated as modules can also be thought of as flowchart steps in a method.

Referring to FIG. 5, the candidate gene pool 116 is initialized by pool initialization module 510, which creates an initial set of candidate individuals in $L_0$ of the gene pool 116. These individuals can be created randomly, or in some embodiments a priori knowledge is used to seed the first generation. In another embodiment, individuals from prior runs can be borrowed to seed a new run. At the start, all individuals are initialized with an experience level of zero and a fitness estimate that is undefined.

Gene testing module 512 then proceeds to test the population in the gene pool 116 on the training data 114. Only a subset of the population in the gene pool 116 is tested at this point. As used herein, the term "subset", unless otherwise qualified, includes both proper and improper subsets as well as the null set. However, for the reasons explained above, the subset which is tested at this point is a non-null subset which includes only those individuals that have not yet reached the top layer $L_T$ of the elitist pool 118 (of which there are none initially). Each individual in the subset undergoes a battery of tests or trials on the training data 114, each trial testing the individual on one sample 410. In one embodiment, each battery might consist of only a single trial. Preferably, however, a battery of tests is much larger, for example on the order of 1000 trials. In one embodiment, at least the initial battery of tests includes at least ExpMin($L_1$) trials for each individual, to enable the initial individuals to qualify for consideration for the first layer of the elitist pool 118. Note there is no requirement that all individuals undergo the same number of trials.

After the tests, gene testing module 512 updates the fitness estimate associated with each of the individuals tested. In an embodiment, the fitness estimate may be an average of the results of all trials of the individual. In this case the "fitness estimate" can conveniently be indicated by two numbers: the sum of the performance measures of all trials of the individual, and the total number of trials that the individual has experienced. The latter number may already be maintained as the experience level of the individual. The fitness estimate at any particular time can then be calculated as follows:

$$\text{fitness estimate} = \frac{\sum_{i=1}^{n} \text{performance measure}_i}{n},$$

where performance measure, is the individual's performance measure when tested on data sample i, and n is the number of data samples on which the individual has been tested, given by the individual's experience level. In an embodiment such as this, "updating" of the fitness estimate can involve merely adding the performance measures from the most recent trials to the prior sum.

In another embodiment, the fitness estimate is capped at a certain level. In other words, for positive values of non-weightedFitness:

fitness estimate=Min(CAP_VALUE,non-weightedFitness).

This technique, which applies a form of weighting which is piecewise rather than smooth, has the effect of reducing the system's sensitivity to very large outlier values.

Preferably, the fitness estimate is modified in dependence upon the ancestry count. In other words:

fitness estimate=*f*(nativeFitness,ancestryCount).

In one embodiment the function f varies non-decreasingly with increasing values of ancestryCount, though in other embodiments the function f need not be so limited. The above adaptations can also be used in combination with each other. After the gene testing module 512 has updated the fitness estimate associated with each of the individuals tested, competition module 514 updates the candidate pool 116 contents in dependence upon the updated fitness estimates. The operation of module 514 is described in more detail below, but briefly, the module considers individuals from lower layers for promotion into higher layers, discards individuals that do not meet the minimum individual fitness of their target layer, and discards individuals that have been replaced in a layer by new entrants into that layer. Candidate gene pool 116 is updated with the revised contents.

Note that other considerations can also be applied beneficially to discard certain individuals at this stage. For example the relative ancestry counts of the individuals can be taken into account in the competition as described in more detail below.

After the candidate gene pool 116 has been updated, a procreation module 516 evolves a random subset of them. Only individuals in the elitist pool are permitted to procreate. Any conventional or future-developed technique can be used for procreation. In an embodiment, conditions, outputs, or rules from parent individuals are combined in various ways to form child individuals, and then, occasionally, they are mutated. The combination process for example may include crossover—i.e., exchanging conditions, outputs, or entire rules between parent individuals to form child individuals. New individuals created through procreation begin with an experience level of zero and with a fitness estimate that is undefined. These individuals are placed in $L_0$ of the gene pool 116. Preferably, after new individuals are created by combination and/or mutation, the parent individuals are retained. In this case the parent individuals also retain their experience level and fitness estimates, and remain in their then-current elitist pool layers. In another embodiment, the parent individuals are discarded.

After procreation, gene testing module 512 operates again on the updated gene pool 116. The process continues repeatedly.

Sometime after the top layer of elitist pool 118 is full, individuals can be harvested for use by production system 112. Gene harvesting module 518 retrieves individuals for that purpose. In one embodiment, gene harvesting module 518 retrieves individuals periodically, whereas in another embodiment it retrieves individuals only in response to user input. Gene harvesting module 518 selects only from the top layer $L_T$, and can apply further selection criteria as well in order to choose desirable individuals. For example, in one embodiment it selects only the fittest individuals from $L_T$. In the same or another embodiment the ancestry count is taken into account when selecting for harvesting. Other criteria will be apparent to the reader. The individuals also undergo further validation as part of this further selection criteria, by testing on historical data not part of training data 114. The individuals selected by the gene harvesting module 518 are written to the production gene population database 122 for use by production system 112 as previously described.

As mentioned, competition module 514 manages the graduation of individuals from lower layers in the candidate gene pool 116, up to higher layers. This process can be thought of as occurring one individual at a time, as follows. First, a loop is begun through all individuals whose experience level has changed since the last time competition module 514 was executed. If the current individual's experience level has not increased sufficiently to qualify it for the next experience layer in the elitist pool 118, then the individual is ignored and the next one is considered. If the current individual's experience level has increased sufficiently to qualify it for a new experience layer, then the module 514 determines whether the target experience layer is already at quota. If not, then the individual is simply moved into that experience level. If the target layer is full, then the competition module 514 determines whether the fitness estimate of the current individual exceeds that of the least fit individual in the target layer. If so, then the least fit individual is discarded, and the current individual is moved up into the target layer. If not, then the current individual is discarded. The process then moves on to consider the next individual in sequence. Note that while individuals typically move up by only one experience layer at a time, that is not requirement in all embodiments. In some embodiments, such as in a client/server embodiment, it may happen that a particular individual is not considered for advancement within the elitist pool 118 until after its experience level has increased sufficiently for it to jump past one or more experienced layers.

In an embodiment that enforces an elitist pool minimum fitness, the step in which the fitness estimate of the current individual is compared to the minimum fitness of the target layer, can further include a test of whether the current individual's fitness estimate satisfies the elitist pool minimum fitness. Typically this latter test is applied only on individuals graduating out of level 0, but as mentioned previously, could be applied to individuals being considered for other layers in the elitist pool 118 as well. If the current individual does not satisfy the elitist pool minimum fitness, then it is discarded.

The above routine processes individuals sequentially, and different embodiments can implement different sequences for processing the individuals. Note that the processing sequence can affect the results if, for example, an individual in layer $L_i$ is being considered for layer $L_{i+1}$ at the same time that an individual in layer $L_{i-1}$ is being considered for layer $L_i$. If the former test occurs first, then a hole will be opened in layer $L_i$ and the individual graduating from layer $L_{i-1}$ will be promoted into layer $L_i$ automatically. If the latter test occurs first, then the individual graduating from layer $L_{i-1}$ will have to compete for its place in layer $L_i$ (assuming layer $L_i$ is at quota). In another embodiment, individuals are considered layer by layer either according to their target layer after promotion, or according to their current layer prior to promotion. Again, the sequence of individuals to consider within each layer will depend on the embodiment, as will the sequence in which the layers themselves are considered.

Figure 6:
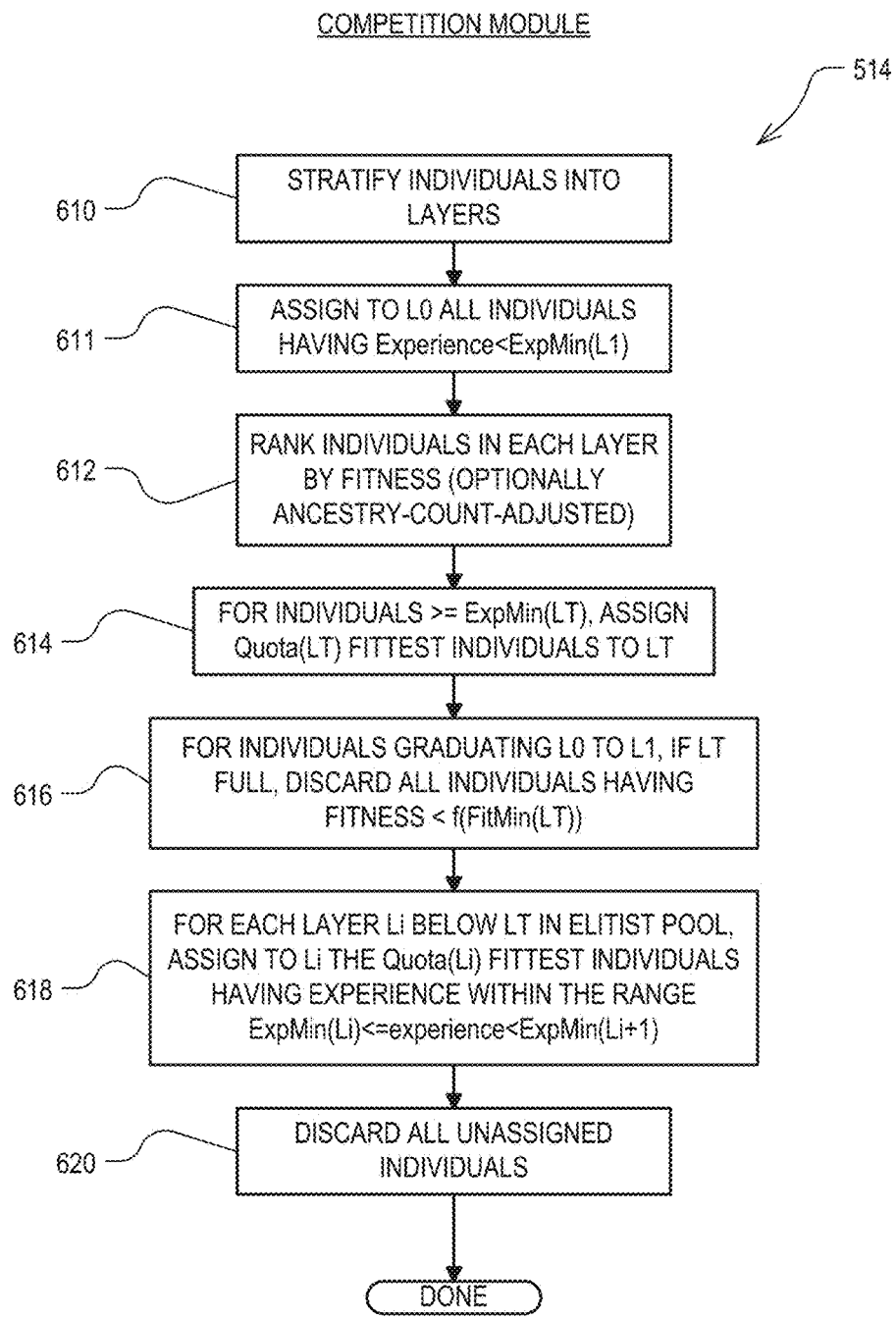
FIG. 6 illustrates a method of operation of the competition module in FIG. 5.

FIG. 6 illustrates a bulk-oriented method of operation of competition module 514. In the embodiment of FIG. 6, the layers in the candidate gene pool 116 are disbanded and reconstituted each time the competition module 514 executes. These executions of competition module 514 are sometimes referred to herein as competition "events", and each comparison made between the fitness estimate of one individual and that of another is sometimes referred to herein as a comparison "instance".

In step 610, all the individuals in candidate gene pool 116 are stratified into their experience layers. In step 611, all individuals whose experience level is still within that of $L_0$, are assigned automatically to $L_0$. In step 612, within each experience layer $L_1$-$L_T$, the individuals are ranked according to their fitness estimates. In embodiments in which ancestry count is taken into account in the calculation of an individual's fitness estimate, the ranking in step 612 will be affected by that calculation. In step 614, of those individuals whose experience level is at least equal to the minimum experience level of the top layer of the elitist pool 118, the Quota($L_T$) fittest are assigned to $L_T$. Note that this step could exclude some individuals with top layer experience, as individuals coming up from layer $L_{T-1}$ can supplant less fit individuals that were previously in $L_T$.

Step 616 implements the policy that once $L_T$ is full, no individuals are allowed into the elitist pool 118 unless they are at least as fit as some predetermined function f( ) of the top layer minimum fitness. In step 616, therefore, if $L_T$ is full, all individuals graduating from $L_0$ to $L_1$ whose fitness estimate is less than f(FitMin($L_T$)) are discarded. Variations of step 616 to implement variations of the elitist pool minimum fitness policy, will be apparent. In step 618, for each layer $L_i$ below the top layer $L_T$, all the individuals in the elitist gene pool 118 having experience level within the range associated with layer $L_i$ are considered. Of these individuals, only the Quota($L_i$) fittest individuals are assigned to layer $L_i$. In step 620, all individuals remaining in elitist gene pool 118 which were not assigned to specific layers in steps 611, 614 or 618, are discarded.

As used herein, a phrase such as "only the five fittest individuals", need not necessarily fill all five places. That is, if there are only three individuals to consider, the phrase is satisfied if all three individuals are assigned places. Thus it can be seen that step 618 includes both a policy that individuals entering a layer that is already at quota must compete for their place in that layer, as well as a policy that individuals entering a layer that is not yet full are promoted to that layer automatically. It can also be seen that steps 618 and 620 together implement a policy that fitness comparisons are made only among individuals having roughly the same experience.

In the above discussion of competition, in some embodiments and for purposes of the competition, the competition module 514 adjusts the fitness level of each individual in dependence upon the individual's ancestry count. In one embodiment, module 514 applies a handicap of a fixed percentage against individuals whose ancestry count exceeds a predetermined number of generations. For example, if the ancestry count exceeds 10 generations, then the individual's fitness estimate is multiplied by 90% before being subjected to the competition. Further handicapping steps may be used in certain further embodiments, for example multiplying the individual's fitness estimate by 80% if its ancestry count exceeds 15 generations. More generally, competition module 514 applies to each individual a handicap with a magnitude that increases monotonically with the individual's ancestry count. As used herein, a "monotonically" increasing relationship need not necessarily increase constantly; it is sufficient if it varies, and does so non-decreasingly. In another embodiment, the adjustment that module 514 applies to individuals may in some instances increase the individual's apparent fitness estimate for purposes of the competition.

Figure 7:
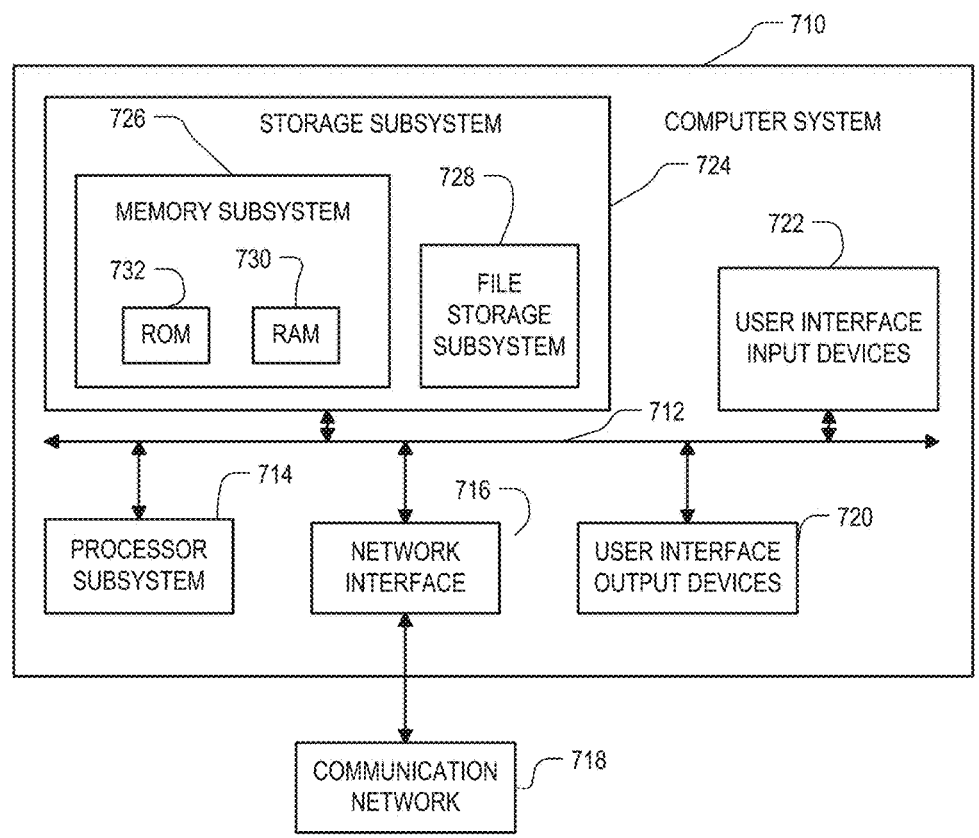
FIG. 7 is a simplified block diagram of a computer system that can be used to implement either or both of the training system or production system in FIG. 1, and/or the training server and clients in FIG. 8.

FIG. 7 is a simplified block diagram of a computer system 710 that can be used to implement training system 110, production system 126, or both. While FIGS. 1, 5, 6 and 9 indicate individual components for carrying out specified operations, it will be appreciated that each component actually causes a computer system such as 710 to operate in the specified manner.

Computer system 710 typically includes a processor subsystem 714 which communicates with a number of peripheral devices via bus subsystem 712. These peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks, including an interface to communication network 718, and is coupled via communication network 718 to corresponding interface devices in other computer systems. Communication network 718 may comprise many interconnected computer systems and communication links. These communication links may be wireline links, optical links, wireless links, or any other mechanisms for communication of information. While in one embodiment, communication network 718 is the Internet, in other embodiments, communication network 718 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 722 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 710 or onto computer network 718.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system. In particular, an output device of the computer system 710 on which production system 112 is implemented, may include a visual output informing a user of action recommendations made by the system, or may include a communication device for communicating action signals directly to the controlled system 128. Additionally or alternatively, the communication network 718 may communicate action signals to the controlled system 128. In the financial asset trading environment, for example, the communication network 718 transmits trading signals to a computer system in a brokerage house which attempts to execute the indicated trades.

Storage subsystem 724 stores the basic programming and data constructs that provide the functionality of certain embodiments of the present invention. For example, the various modules implementing the functionality of certain embodiments of the invention may be stored in storage subsystem 724. These software modules are generally executed by processor subsystem 714. Storage subsystem 724 also stores the candidate gene pool 116, the training database 114, and/or the production gene population 122. Alternatively, one or more of such databases can be physically located elsewhere, and made accessible to the computer system 710 via the communication network 718.

Memory subsystem 726 typically includes a number of memories including a main random access memory (RAM) 730 for storage of instructions and data during program execution and a read only memory (ROM) 732 in which fixed instructions are stored. File storage subsystem 728 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 728. The host memory 726 contains, among other things, computer instructions which, when executed by the processor subsystem 714, cause the computer system to operate or perform functions as described herein. As used herein, processes and software that are said to run in or on "the host" or "the computer", execute on the processor subsystem 714 in response to computer instructions and data in the host memory subsystem 726 including any other local or remote storage for such instructions and data.

Bus subsystem 712 provides a mechanism for letting the various components and subsystems of computer system 710 communicate with each other as intended. Although bus subsystem 712 is shown schematically as a single bus, alternative embodiments of the bus subsystem may use multiple busses.

Computer system 710 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 710 depicted in FIG. 7 is intended only as a specific example for purposes of illustrating the preferred embodiments of the present invention. Many other configurations of computer system 710 are possible having more or less components than the computer system depicted in FIG. 7.

Client/Server Embodiment

In some environments, the training data used to evaluate an individual's fitness can be voluminous. Therefore, even with modern high processing power and large memory capacity computers, achieving quality results within a reasonable time is often not feasible on a single machine. A large gene pool also requires a large memory and high processing power. In one embodiment, therefore, a client/server model is used to provide scaling in order to achieve high quality evaluation results within a reasonable time period. Scaling is carried out in two dimensions, namely in pool size as well as in evaluation of the same individual to generate a more diverse gene pool so as to increase the probability of finding fitter individuals. In the client/server embodiment, the gene pool is distributed over a multitude of clients for evaluation. Each client continues to evaluate its own client-centric gene pool using data from training database 114, which it may receive in bulk or periodically on a sustained and continuing basis. Individuals that satisfy one or more predefined conditions on a client computer are transmitted to the server to form part of a server-centric gene pool.

Distributed processing of individuals also may be used to increase the speed of evaluation of a given individual. To achieve this, individuals that are received by the server but have not yet been tested on a certain number of samples, or have not yet met one or more predefined conditions, may be sent back from the server to a multitude of clients for further evaluation. The evaluation result achieved by the clients (alternatively called herein a partial evaluation) for an individual is transferred back to the server. The server merges the partial evaluation results of an individual with that individual's fitness estimate at the time it was sent to the clients to arrive at an updated fitness estimate for that individual in the server-centric gene pool. For example, assume that an individual has been tested on 500 samples and is sent from the server to, for example, two clients each instructed to test the individual on 100 additional samples. Accordingly, each client further tests the individual on the additional 100 samples and reports its own client-centric fitness estimate to the server. The server combines these two estimates with the individual's fitness estimate at the time it was sent to the two clients to calculate an updated server-centric fitness estimate for the individual. The combined results represent the individual's fitness evaluated over 700 days. In other words, the distributed system, in accordance with this example, increases the experience level of an individual from 500 samples to 700 samples using only 100 different training samples at each client. A distributed system, in accordance with the present invention, is thus highly scalable in evaluating its individuals.

Advantageously, clients are enabled to perform individual procreation locally, thereby improving the quality of their individuals. Each client is a self-contained evolution device, not only evaluating the individuals in its own pool, but also creating a new generation of individuals and moving the evolutionary process forward locally. Thus clients maintain their own client-centric gene pool which need not match each other's or the server-centric gene pool. Since the clients continue to advance with their own local evolutionary process, their processing power is not wasted even if they are not in constant communication with the server. Once communication is reestablished with the server, clients can send in their fittest individuals to the server and receive additional individuals from the server for further testing.

Figure 8:
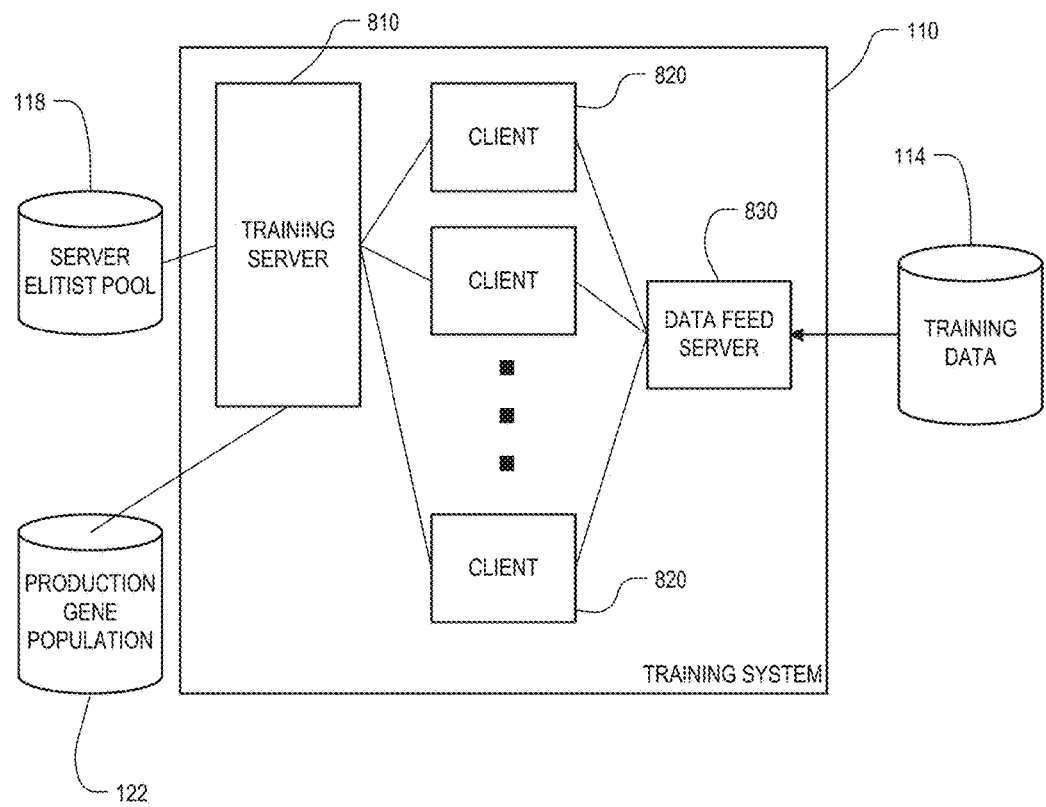
FIG. 8 is a high-level block diagram of an example embodiment of the training system of FIG. 1 using a network computing system.

FIG. 8 is a high-level block diagram of an example embodiment of training system 110 implemented using a network computing system. The training system 110 includes a plurality of client computers 820 (sometimes referred to herein simply as "clients") and a training server computer 810. Server 810 may itself be a central or a distributed server. A client computer 820 may be a laptop computer, a desktop computer, a cellular/VoIP handheld computer or smart phone, a tablet computer, distributed computer, or the like. An example system may have hundreds of thousands of clients. In an embodiment, the training server and/or each of the client computers can have the structure of FIG. 7, or any of its variations as described above. The client computers 820 communicate with the training sever 810 to receive individuals for testing, and to report tested individuals back to the training server 810. The training server 810 maintains a server-centric experience-layered elitist pool 118, but in an embodiment, does not maintain any candidate individuals below layer $L_1$ of the elitist pool. New individuals are created by clients, both during initialization and by procreation, and they are not reported to the training server 810 until they have been tested on sufficient numbers of samples to qualify for the server's elitist pool 118. The number of individuals created by the clients 820 may vary depending on the memory size and the CPU processing power of the client. For example, in one embodiment, a client may have 1000 individuals for evaluation. Each client computer 820 further has a communication port to access one or more data feed servers 830, which retrieve and forward training samples from the training database 114 to the client computers 820. Alternatively, although not shown, the training samples may be supplied from data feed server 830 to the clients 820 via the training server 810.

Figure 9:
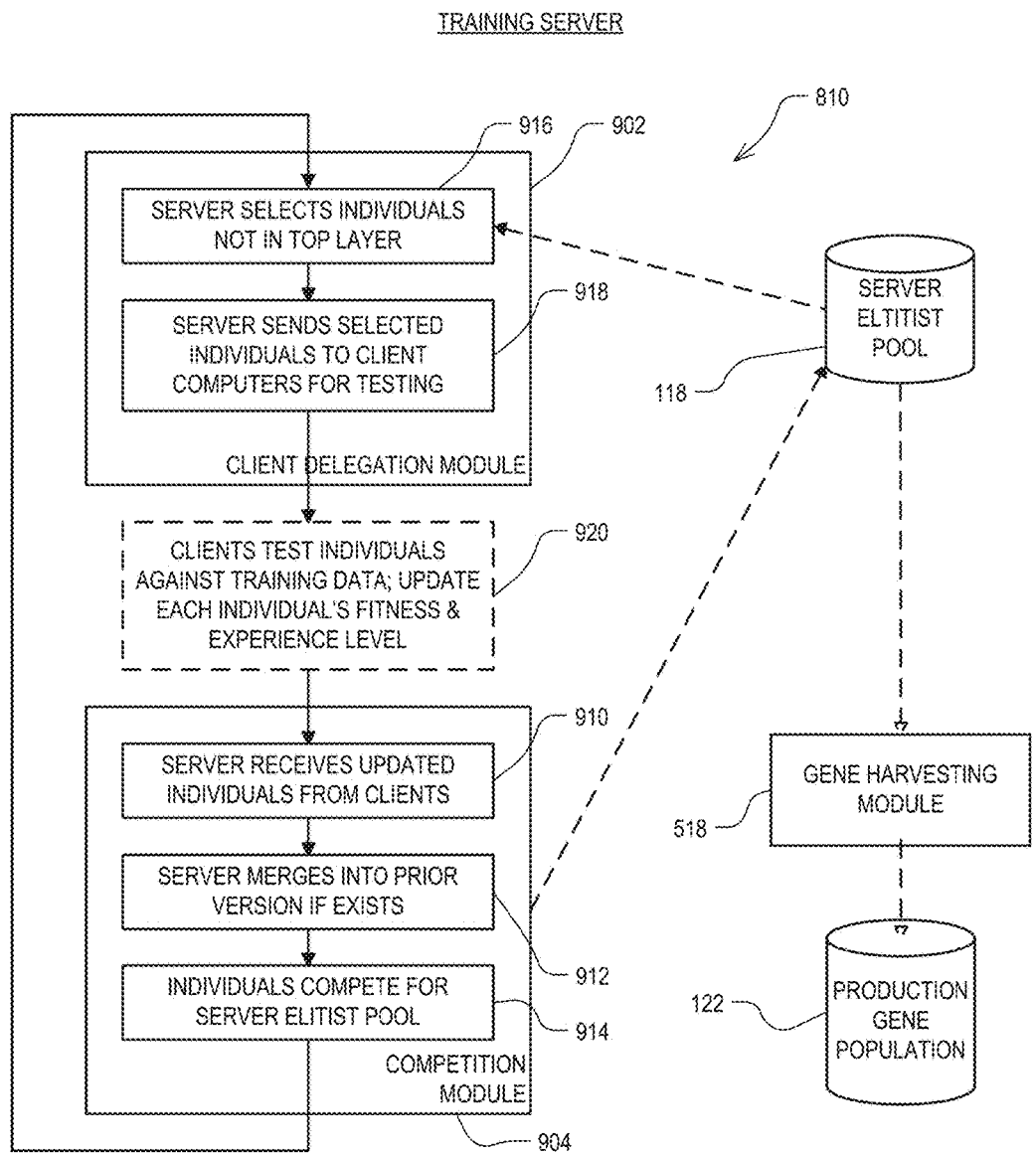
FIG. 9 illustrates modules that can be used to implement the functionality of training server of FIG. 8.

FIG. 9 illustrates various modules that can be used to implement the functionality of training server 810 (FIG. 8). Elitist pool 118 and production gene population database 122 are also shown in the drawing. As in the embodiment of FIG. 5, solid lines in FIG. 9 indicate process flow, and broken lines indicate data flow. The implementation variations mentioned above with respect to the embodiment of FIG. 5 apply to FIG. 9 as well.

In the operation of the client/server model, the training server 810 does not perform any testing or procreation itself. It does, however, enforce competition within its own server-centric elitist pool 118 when individuals are returned from clients. FIG. 9 illustrates various modules that can be used to implement the functionality of training server 810. Like the embodiment of FIG. 5, the training server 810 includes a competition module 904. It also includes gene harvesting module 518, which may be same as in FIG. 5. It also includes gene testing and procreation functionality, but these are combined into a single client delegation module 902 in FIG. 9. The client delegation module 902 and the competition module 904 constitute two sub-modules in a gene pool processor module (not shown specifically in FIG. 9). The FIG. 9 embodiment does not include a pool initialization module in the sense of FIG. 5, since as mentioned, the clients initialize their own individual pools.

Referring to FIG. 9, in step 910, the competition module 904 receives individuals from one or more of the client computers 820. These individuals may arrive asynchronously, if and when client computers have them available to transmit. They may arrive out-of-order, and some individuals previously sent out for testing may never return. Individuals may arrive individually, or in bunches. If an arriving individual is new to the training server 810 (and, in some embodiments, also if the arriving individual is already known to the training server 810), the training server 810 also receives and stores the ancestry count of the arriving individual. At various times determined by competition module 904, after at least one individual has arrived, competition module 904 proceeds to step 912 to begin a competition "event".

In step 912, competition module 904 determines whether each incoming individual is a new one, or a return of an individual that the server previously sent out for testing. This determination can be made on the basis of individual IDs 312 (FIG. 3). If the latter, then the training server 810 merges the newly received copy of the individual into the prior version in the server-centric elitist pool 118. In one embodiment, the merging step involves merely replacing the prior copy of the individual in the server-centric elitist pool 118, with the one newly received. In a variation of that embodiment, replacing may involve merely updating the experience level and the fitness estimation of the prior copy of the individual in the server-centric elitist pool 118.

In step 914 the incoming individual (if new) or the updated individual (if merged) competes for its position in the server elitist pool 118. The same variations and rules of competition apply here as they do for the competition module 514 in the server-only model. That is, the fitness estimate of the incoming individual is compared to the least fit individual in the now-appropriate experience layer for the incoming individual, and only the fitter of the two is retained. The other is discarded. An elitist pool minimum fitness policy can be applied here as well, based on a server-centric minimum fitness level. Alternatively, the entire server elitist pool 118 can be disbanded and reconstituted at each competition event, as described in more detail with respect to FIG. 6. In either case, though not required in all embodiments, it is preferred that the fitness estimates compared in the competition step 914 take into account the ancestry counts of the individuals, as explained above with respect to FIG. 6.

In the client delegation module 902, in step 916, the server 810 selects individuals from the server-centric elitist pool 118, and sends them out to one or more clients 820 for further testing (step 918). Preferably the client delegation module 902 sends the selected individuals together with their respective ancestry counts. As in the server-only embodiment, the client delegation module 902 is restricted from selecting for further testing individuals already in the top layer of the elitist pool 118. In one embodiment, the battery of trials that an individual is to undergo is dictated by the training server. In such an embodiment, the server-centric view of the battery is the same as the client-centric view of the battery. In another embodiment, the battery of trials that an individual is to undergo is left to the client to decide, and client may perform more than one battery of trials on the individual before returning it to the server. In the latter embodiment, the client has its own client-centric view of a testing battery.

In step 920 the client machines 820 test the individuals against training data from the data feed server 830, and update each individual's fitness and experience level locally. Step 920 is shown in broken lines in FIG. 9 because it is performed by clients rather than training server 810. At various subsequent times, the server 810 again receives back updated individuals from the clients in step 910, and repeats the process of FIG. 9.

The operation of the client computers 820 is the same as that previously described with respect to FIGS. 5 and 6, with the exception that individuals are provided both by the pool initialization module 510, as well as from the training server 810. The candidate gene pool 116 in a client computer 820 is client-centric, and includes all candidate individuals being considered by the clients, including those that do not yet have sufficient experience to be considered for the elitist pool in the client computer. The candidate gene pool in the clients are layer-oriented as shown in FIG. 2, and for convenience, the layers in a client computer are sometimes designated herein with a top layer numbered CT rather than T, and with layers designated $CL_0$-$CL_{CT}$. None of the layer parameters in the client-centric gene pool, including the number of layers, need be the same as their corresponding parameters in other clients or in the server. Preferably the candidate gene pool 116 in the client computers 820 are implemented using linked lists, whereas the elitist pool 118 in the server 810 are implemented using a DBMS, both as previously described.

Unlike the single server embodiment, the gene testing module in the client computer 820 does not prevent further testing of individuals that have reached the top layer $CL_{CT}$ of the client-centric elitist pool 820. The gene harvesting module in a client computer 820 selects individuals only from the top layer $CL_{CT}$ of the client computer 820 for transmitting back to the server 810. Since the server 810 does not maintain any individuals that do not qualify for the server-centric elitist pool 118, the minimum experience level of the top layer $CL_{CT}$ in the client-centric elitist pool on each client computer 820 must be at least as high as the minimum experience level of the lowest layer $L_1$ of the elitist pool 118 of the training server 810. Preferably the minimum experience level of the top layer $CL_{CT}$ in the client-centric elitist pool on each client computer 820 is equal to the minimum experience level of the lowest layer $L_1$ of the elitist pool 118 of the training server 810.

Note that because of procreation on the client system 820, individuals may be sent up to the training server 810 which the training server 810 had never before seen. Such individuals are handled in step 914 (FIG. 9), by requiring them to compete for their position in the server-centric elitist pool 118 of the training server 810. Note further that because of competition in the client computer 820, some individuals that the training server 810 sent to the client computer 820 for further testing will never be returned to the training server 810. In this case the prior copy of the individual, retained by the training server 810, remains in place in the elitist pool 118 of the training server 810 unless and until it is displaced through competition in the training server 810 (step 914). Still further, note that an individual retained in the training server 810 after it has also been sent to a client 820 for further testing, may become displaced and deleted from the elitist pool 118 in the training server 810 through competition in the training server 810 (step 914). In this case, if the same individual is returned by the client computer 820, the training server 810 simply ignores it.

Figure 10:
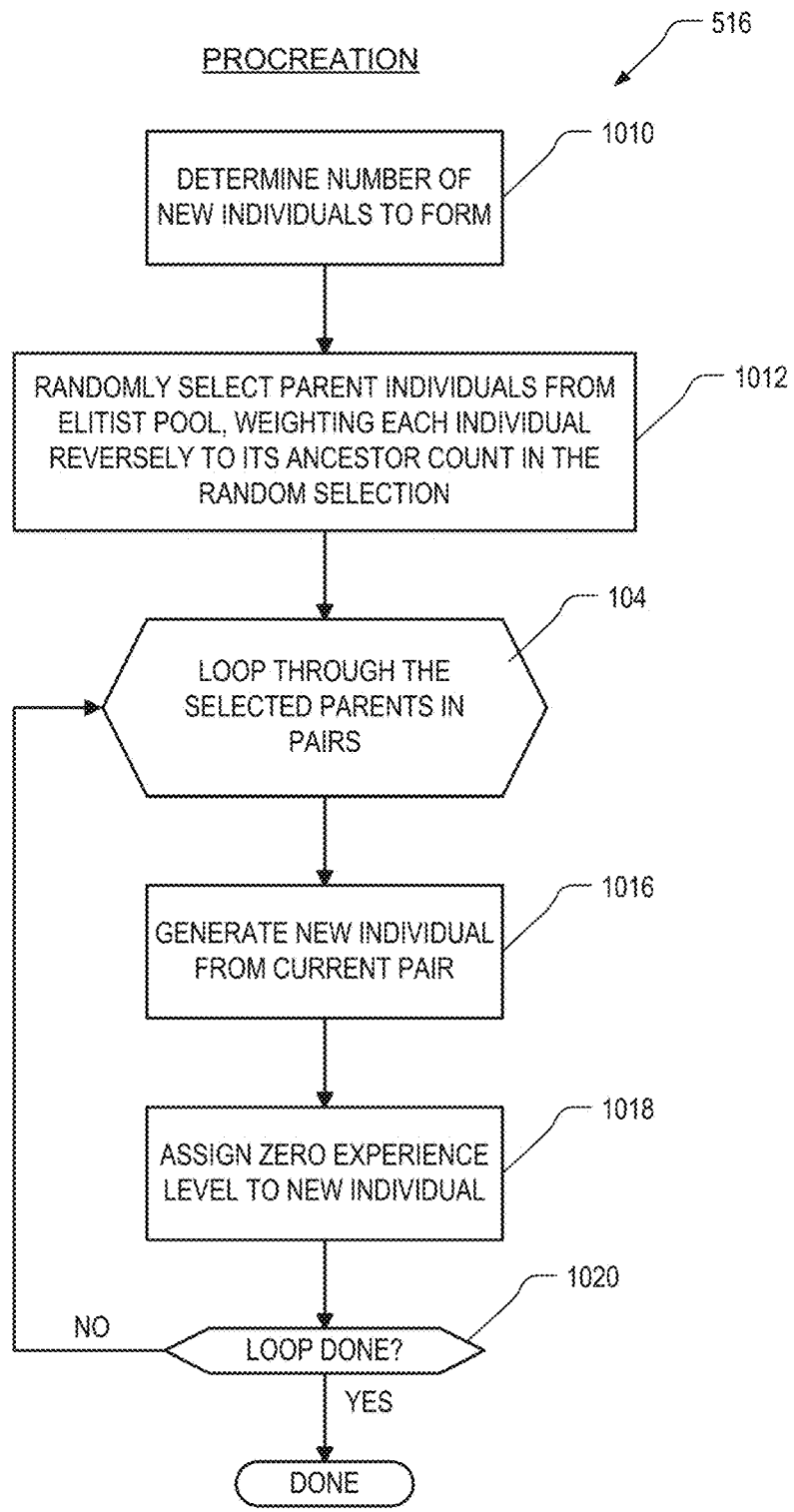
FIG. 10 is a flow chart illustrating an embodiment in which ancestry count is taken into account during procreation.

As mentioned, the procreation events that take place in procreation module 516 (FIG. 5) can, in some embodiments, be affected by the ancestry counts of the individuals involved. FIG. 10 is a flow chart illustrating an embodiment of this feature in more detail. Referring to FIG. 10, in step 1010 the procreation module 516 determines how many new individuals to form in the current procreation event. For example, the number in one embodiment is calculated as 5% of the total number of individuals in the elitist pool.

In step 1012, the procreation module 516 selects parent individuals from the elitist pool to use in the procreation process. Typically the individuals are selected randomly from throughout the elitist pool, though in an experience layered embodiment they might be selected only from one or more layers of the elitist pool. In some embodiments, the ancestry counts of the individuals are used to weight the likelihood that an individual is selected in this step. For example, individuals having more than a threshold ancestry count might be weighted so as to increase or decrease the likelihood that they will be selected in this step, depending on whether it is desired to amplify or attenuate the effects of greater ancestry count. More generally, the procreation module 516 can apply a weight to the random selection which depends in some way upon the individual's ancestry count.

In step 1014, the procreation module 516 begins a loop through the selected parents. Preferably parents are selected in pairs, and each new individual is formed from exactly two parents. In another embodiment, however, new individuals can be formed from a single parent individual, or from three or more parent individuals. In general, a "set" of one or more parents is used in the formation of each new individual by procreation.

In step 1016, a new individual is formed from the current set of parents. Any method of procreation can be used, such as those set forth elsewhere herein. In step 1018 a zero experience level is assigned to the new individual, and in step 1020 it is determined whether there are more sets of parents selected to procreate. If so, then procreation module 516 returns back to step 1014 to generate another new individual by procreation.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, ancestry counts for individuals in candidate gene pool 116 can in some embodiments be made available for external retrieval and/or analysis through the use of an API (not shown). As another example, ancestry counts can be used as a measure of convergence of the candidate gene pool. For example, in one embodiment, a system periodically computes an Average Fitness Leap Per Ancestor Count Increment of the candidate population. If the rate of change of such a measure is in continual decline down to a certain threshold, convergence is indicated and further procreation or evaluation of the population is terminated. Further, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A data mining system, for use with a data mining training database containing a plurality of data samples, comprising:
   a computer system having a memory having a candidate gene database identifying a pool of candidate individuals, each of the candidate individuals identifying a plurality of conditions and at least one corresponding proposed output in dependence upon the conditions, and a gene pool processor which:

performs a procreation step of forming new individuals in the pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

tests each individual in a testing subset of at least one of the candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

calculates an overall fitness estimate for each of the individuals in the testing subset, in dependence upon the results proposed by the respective individual when the conditions of the respective individual were applied to the respective subset of the data samples; and stores, in association with each of the candidate individuals in the testing subset, a respective ancestry count indicating a respective number of procreation events in the ancestry of the individual, the gene pool processor further including a competition module which (i) adjusts respective overall fitness estimates of the individuals in dependence upon their respective ancestry counts and (ii) selects individuals for discarding in dependence upon comparisons among their respective overall fitness estimates, the computer system further having a gene harvesting module providing for deployment selected ones of the remaining individuals from the pool of candidate individuals, wherein the computer system comprises a server and a collection of at least one client device, and wherein in testing each individual in a testing subset of at least one of the candidate individuals:

the server delegates to the at least one client device the testing of the individuals in the testing subset; and the server receives tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

2. The system of claim 1, wherein the competition module groups individuals into one or more of a plurality of testing experience level groups in dependence upon their testing experience levels, and selects individuals for discarding further in dependence upon their respective testing experience level groups.

3. The system of claim 1, wherein the competition module adjusts the respective overall fitness estimates in dependence upon their respective ancestry counts by handicapping their respective overall fitness estimates in dependence upon their respective ancestry counts.

4. The system of claim 3, wherein the handicap applied to each given one of the individuals by the competition module varies non-decreasingly as a function of the ancestry count of the given individual.

5. The system of claim 1, wherein in the procreation step the gene pool processor randomly selects the parent individuals for the subject new individual using a random selection weighted in dependence upon individuals' ancestry counts.

6. The system of claim 1, wherein in providing for deployment of selected ones of the remaining individuals from the pool of candidate individuals, the gene harvesting module provides for deployment individuals from the pool of candidate individuals selected in dependence upon comparisons among their respective ancestry counts.

7. The system of claim 1, wherein in the testing of each individual in the testing subset of the at least one of the candidate individuals:

the server delegates to the at least one client device the testing of the individuals in the testing subset, including indicating, to each client device receiving an individual for testing, the individual's ancestry count; and the server receives tested individuals from the at least one client device.

8. The system of claim 7, wherein in receiving tested individuals from the at least one client device, at least one of the tested individuals is received in association with an indication of its ancestry count.

9. The system of claim 1, wherein the computer system further comprises a module which provides an API for external retrieval of the ancestry counts.

10. A client computer system for a data mining system, for use with a data mining training database containing a plurality of data samples, comprising:

a processing subsystem, a memory having a candidate gene database identifying a client-centric pool of candidate individuals, each of the candidate individuals identifying a plurality of conditions and at least one corresponding proposed output in dependence upon the conditions, and a client gene pool processor which:

performs a procreation step of forming new individuals in the client-centric pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

tests each individual in a testing subset of at least one of the candidate individuals in the client-centric pool of candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

calculates a client-centric overall fitness estimate for each of the individuals in the testing subset, in dependence upon the results proposed by the respective individual when the conditions of the respective individual were applied to the respective subset of the data samples; and stores, in association with each of the candidate individuals in the testing subset, a respective ancestry count indicating a respective number of procreation events in the ancestry of the individual, the client computer system further including a competition module which (i) adjusts respective client-centric overall fitness estimates of the individuals in dependence upon their respective ancestry counts and (ii) selects individuals for discarding in dependence upon comparisons among their respective client-centric overall fitness estimates; and the client computer system further including a gene harvesting module which forwards to a central server infrastructure for potential deployment or further testing, selected ones of the remaining individuals from the client-centric pool of candidate individuals, wherein the data mining system comprises a server and a collection of at least one client device, and wherein in testing each individual in a testing subset of at least one of the candidate individuals:

the server delegates to the at least one client device the testing of the individuals in the testing subset; and the server receives tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

11. The system of claim 10, wherein the competition module groups individuals into one or more of a plurality of testing experience level groups in dependence upon their testing experience levels, and selects individuals for discarding further in dependence upon their respective testing experience level groups.

12. The system of claim 10, wherein the competition module adjusts the respective client-centric overall fitness estimates in dependence upon their respective ancestry counts by handicapping their respective client-centric overall fitness estimates in dependence upon their respective ancestry counts.

13. The system of claim 10, wherein in the procreation step the gene pool processor randomly selects the parent individuals for the subject new individual using a random selection weighted to favor individuals having lower ancestry count over individuals having higher ancestry count.

14. The system of claim 10, wherein in forwarding selected individuals to a central server infrastructure for potential deployment or further testing, the gene harvesting module selects individuals in dependence upon comparisons among their respective ancestry counts.

15. A computer implemented data mining method, for use with a data mining training database containing a plurality of data samples, and for use further with a memory having a candidate gene database identifying a pool of candidate individuals, each of the candidate individuals identifying a plurality of conditions and at least one corresponding proposed output in dependence upon the conditions, the method comprising:

performing a procreation step of forming new individuals in the pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

testing each individual in a testing subset of at least one of the candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

calculating an overall fitness estimate for each of the individuals in the testing subset, in dependence upon the results proposed by the respective individual when the conditions of the respective individual were applied to the respective subset of the data samples;

storing, in association with each of the candidate individuals in the testing subset, a respective ancestry count indicating a respective number of procreation events in the ancestry of the individual;

adjusting respective overall fitness estimates of the individuals in dependence upon their respective ancestry counts and selecting individuals for discarding in dependence upon comparisons among their respective overall fitness estimates;

harvesting for deployment selected ones of the remaining individuals from the pool of candidate individuals;

delegating, by a server and to at least one client device, testing of individuals in a testing subset of at least one of the candidate individuals; and receiving, by the server, tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

16. A data mining method implemented on a client computer system in a client/server environment, for use with a data mining training database containing a plurality of data samples, for use further with a memory having a candidate gene database identifying a client-centric pool of candidate individuals, each of the candidate individuals identifying a plurality of conditions and at least one corresponding proposed output in dependence upon the conditions, the method comprising:

performing a procreation step of forming new individuals in the client-centric pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

testing each individual in a testing subset of at least one of the candidate individuals in the client-centric pool of candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

calculating a client-centric overall fitness estimate for each of the individuals in the testing subset, in dependence upon the results proposed by the respective individual when the conditions of the respective individual were applied to the respective subset of the data samples;

storing, in association with each of the candidate individuals in the testing subset, a respective ancestry count indicating a respective number of procreation events in the ancestry of the individual;

adjusting respective client-centric overall fitness estimates of the individuals in dependence upon their respective ancestry counts and selecting individuals for discarding in dependence upon comparisons among their respective client-centric overall fitness estimates;

forwarding to a central server infrastructure for potential deployment or further testing, selected ones of the remaining individuals from the client-centric pool of candidate individuals;

delegating, by a server and to at least one client device, testing of individuals in a testing subset of at least one of the candidate individuals; and receiving, by the server, tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

17. A computer readable medium, for use with a data mining training database containing a plurality of data samples, and for use further with a memory having a candidate gene database identifying a pool of candidate individuals, each of the candidate individuals identifying a plurality of conditions and at least one corresponding proposed output in dependence upon the conditions, the medium having stored thereon in a non-transitory manner a plurality of code portions which, when executed by a computer system performs data mining steps of:

performing a procreation step of forming new individuals in the pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

testing each individual in a testing subset of at least one of the candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

calculating an overall fitness estimate for each of the individuals in the testing subset, in dependence upon the results proposed by the respective individual when the conditions of the respective individual were applied to the respective subset of the data samples;

storing, in association with each of the candidate individuals in the testing subset, a respective ancestry count indicating a respective number of procreation events in the ancestry of the individual;

adjusting respective overall fitness estimates of the individuals in dependence upon their respective ancestry counts and selecting individuals for discarding in dependence upon comparisons among their respective overall fitness estimates;

harvesting for deployment selected ones of the remaining individuals from the pool of candidate individuals;

delegating, by a server and to at least one client device, testing of individuals in a testing subset of at least one of the candidate individuals; and receiving, by the server, tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

18. A computer readable medium, for use in a client/server environment with a data mining training database containing a plurality of data samples, and for use further with a memory having a candidate gene database identifying a client-centric pool of candidate individuals, each of the candidate individuals identifying a plurality of conditions and at least one corresponding proposed output in dependence upon the conditions, the medium having stored thereon in a non-transitory manner a plurality of code portions which, when executed by a client computer system in the client/server environment, performs data mining steps of:

performing a procreation step of forming new individuals in the client-centric pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

testing each individual in a testing subset of at least one of the candidate individuals in the client-centric pool of candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

calculating a client-centric overall fitness estimate for each of the individuals in the testing subset, in dependence upon the results proposed by the respective individual when the conditions of the respective individual were applied to the respective subset of the data samples;

storing, in association with each of the candidate individuals in the testing subset, a respective ancestry count indicating a respective number of procreation events in the ancestry of the individual;

adjusting respective client-centric overall fitness estimates of the individuals in dependence upon their respective ancestry counts and selecting individuals for discarding in dependence upon comparisons among their respective client-centric overall fitness estimates;

forwarding to a central server infrastructure for potential deployment or further testing, selected ones of the remaining individuals from the client-centric pool of candidate individuals;

delegating, by a server and to at least one client device, testing of individuals in a testing subset of at least one of the candidate individuals; and receiving, by the server, tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

19. A data mining system, for use with a data mining training database containing a plurality of data samples, comprising:

memory means for storing a candidate gene database identifying a pool of candidate individuals, each of the candidate individuals identifying a plurality of conditions and at least one corresponding proposed output in dependence upon the conditions, procreation means for forming new individuals in the pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

testing means for testing each individual in a testing subset of at least one of the candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

evaluating means for calculating an overall fitness estimate for each of the individuals in the testing subset, in dependence upon the results proposed by the respective individual when the conditions of the respective individual were applied to the respective subset of the data samples;

storing means for storing, in association with each of the candidate individuals in the testing subset, a respective ancestry count indicating a respective number of procreation events in the ancestry of the individual;

discarding means for (i) adjusting respective overall fitness estimates of the individuals in dependence upon their respective ancestry counts and (ii) selecting individuals for discarding in dependence upon comparisons among their respective overall fitness estimates; and harvesting means for providing for deployment selected ones of the remaining individuals from the pool of candidate individuals, wherein the data mining system comprises a server and a collection of at least one client device, and wherein in testing each individual in a testing subset of at least one of the candidate individuals:

the server delegates to the at least one client device the testing of the individuals in the testing subset; and the server receives tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

20. A client computer system for use in a client/server data mining environment, for use with a data mining training database containing a plurality of data samples, comprising:

memory means for storing a candidate gene database identifying a client-centric pool of candidate individuals, each of the candidate individuals identifying a plurality of conditions and at least one corresponding proposed output in dependence upon the conditions, the client computer system comprising:

procreation means for forming new individuals in the client-centric pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

testing means for testing each individual in a testing subset of at least one of the candidate individuals in the client-centric pool of candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

evaluating means for calculating a client-centric overall fitness estimate for each of the individuals in the testing subset, in dependence upon the results proposed by the respective individual when the conditions of the respective individual were applied to the respective subset of the data samples;

storing means for storing, in association with each of the candidate individuals in the testing subset, a respective ancestry count indicating a respective number of procreation events in the ancestry of the individual;

discarding means for (i) adjusting respective client-centric overall fitness estimates of the individuals in dependence upon their respective ancestry counts and (ii) selecting individuals for discarding in dependence upon comparisons among their respective client-centric overall fitness estimates; and harvesting means for forwarding to a central server infrastructure for potential deployment or further testing, selected ones of the remaining individuals from the client-centric pool of candidate individuals, wherein the client/server data mining environment comprises a server and a collection of at least one client device, and wherein in testing each individual in a testing subset of at least one of the candidate individuals:

the server delegates to the at least one client device the testing of the individuals in the testing subset; and the server receives tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

21. A data mining system, for use with a data mining training database containing a plurality of data samples, comprising:
a computer system having a memory having a candidate gene database identifying a pool of candidate individuals, each of the candidate individuals identifying a plurality of conditions and at least one corresponding proposed output in dependence upon the conditions, and
a gene pool processor which:
performs a procreation step of forming new individuals in the pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;
tests each individual in a testing subset of at least one of the candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;
calculates an overall fitness estimate for each of the individuals in the testing subset, in dependence upon the results proposed by the respective individual when the conditions of the respective individual were applied to the respective subset of the data samples; and
stores, in association with each of the candidate individuals in the testing subset, a respective ancestry count indicating a respective number of procreation events in the ancestry of the individual,
the gene pool processor further including a competition module which selects individuals for discarding in dependence upon comparisons among their respective overall fitness estimates,
the computer system further having a gene harvesting module providing for deployment selected ones of the remaining individuals from the pool of candidate individuals,
wherein, in the procreation step, the gene pool processor randomly selects the parent individuals for the subject new individual using a random selection weighted in dependence upon individuals' ancestry counts,
wherein the computer system comprises a server and a collection of at least one client device, and
wherein in testing each individual in a testing subset of at least one of the candidate individuals:
the server delegates to the at least one client device the testing of the individuals in the testing subset; and
the server receives tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

22. The system of claim 21, wherein the competition module:
selects individuals for discarding further in dependence upon their respective ancestry counts; and
when selecting individuals for discarding, handicaps their respective overall fitness estimates in dependence upon their respective ancestry counts.

23. A client computer system for a data mining system, for use with a data mining training database containing a plurality of data samples, comprising:
a processing subsystem,
a memory having a candidate gene database identifying a client-centric pool of candidate individuals, each of the candidate individuals identifying a plurality of conditions and at least one corresponding proposed output in dependence upon the conditions, and
a client gene pool processor which:
performs a procreation step of forming new individuals in the client-centric pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;
tests each individual in a testing subset of at least one of the candidate individuals in the client-centric pool of candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;
calculates a client-centric overall fitness estimate for each of the individuals in the testing subset, in dependence upon the results proposed by the respective individual when the conditions of the respective individual were applied to the respective subset of the data samples; and
stores, in association with each of the candidate individuals in the testing subset, a respective ancestry count indicating a respective number of procreation events in the ancestry of the individual,
the client computer system further including a competition module which selects individuals for discarding in dependence upon comparisons among their respective client-centric overall fitness estimates; and
the client computer system further including a gene harvesting module which forwards to a central server infrastructure for potential deployment or further testing, selected ones of the remaining individuals from the client-centric pool of candidate individuals,
wherein, in the procreation step, the client gene pool processor randomly selects the parent individuals for the subject new individual using a random selection weighted in dependence upon individuals' ancestry counts,
wherein the data mining system comprises a server and a collection of at least one client device, and
wherein in testing each individual in a testing subset of at least one of the candidate individuals:
the server delegates to the at least one client device the testing of the individuals in the testing subset; and the server receives tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

24. The system of claim 23, wherein the competition module:

selects individuals for discarding further in dependence upon their respective ancestry counts; and when selecting individuals for discarding, handicaps their respective client-centric overall fitness estimates in dependence upon their respective ancestry counts.

25. A computer implemented data mining method, for use with a data mining training database containing a plurality of data samples, and for use further with a memory having a candidate gene database identifying a pool of candidate individuals, each of the candidate individuals identifying a plurality of conditions and at least one corresponding proposed output in dependence upon the conditions, the method comprising:

performing a procreation step of forming new individuals in the pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

testing each individual in a testing subset of at least one of the candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

calculating an overall fitness estimate for each of the individuals in the testing subset, in dependence upon the results proposed by the respective individual when the conditions of the respective individual were applied to the respective subset of the data samples;

storing, in association with each of the candidate individuals in the testing subset, a respective ancestry count indicating a respective number of procreation events in the ancestry of the individual;

selecting individuals for discarding in dependence upon comparisons among their respective overall fitness estimates; and harvesting for deployment selected ones of the remaining individuals from the pool of candidate individuals, wherein the procreation step includes randomly selecting the parent individuals for the subject new individual using a random selection weighted in dependence upon individuals' ancestry counts, wherein the method further includes delegating, by a server and to at least one client device, testing of individuals in a testing subset of at least one of the candidate individuals, and wherein the method further includes receiving, by the server, tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

26. The computer implemented data mining method of claim 25, wherein the selecting of individuals for discarding selects individuals for discarding further in dependence upon their respective ancestry counts, such that when selecting individuals for discarding, their respective overall fitness estimates are handicapped in dependence upon their respective ancestry counts.

27. A data mining method implemented on a client computer system in a client/server environment, for use with a data mining training database containing a plurality of data samples, for use further with a memory having a candidate gene database identifying a client-centric pool of candidate individuals, each of the candidate individuals identifying a plurality of conditions and at least one corresponding proposed output in dependence upon the conditions, the method comprising:

performing a procreation step of forming new individuals in the client-centric pool of candidate individuals at least in part by copying into each subject new individual at least one member of the group consisting of: a condition in an individual in a set of at least one parent individual corresponding to the subject new individual, and an output in an individual in the set of parent individuals corresponding to the subject new individual;

testing each individual in a testing subset of at least one of the candidate individuals in the client-centric pool of candidate individuals, each of the tests applying the conditions of the respective individual to a respective subset of the data samples in the training database to propose a result, each individual in the testing subset being tested on at least one data sample and at least one of the individuals in the testing subset being tested on more than one data sample;

calculating a client-centric overall fitness estimate for each of the individuals in the testing subset, in dependence upon the results proposed by the respective individual when the conditions of the respective individual were applied to the respective subset of the data samples;

storing, in association with each of the candidate individuals in the testing subset, a respective ancestry count indicating a respective number of procreation events in the ancestry of the individual;

selecting individuals for discarding in dependence upon comparisons among their respective client-centric overall fitness estimates; and forwarding to a central server infrastructure for potential deployment or further testing, selected ones of the remaining individuals from the client-centric pool of candidate individuals, wherein the procreation step further includes randomly selecting the parent individuals for the subject new individual using a random selection weighted in dependence upon individuals' ancestry counts, wherein the client/server environment comprises a server and a collection of at least one client device, and wherein in testing each individual in a testing subset of at least one of the candidate individuals:

the server delegates to the at least one client device the testing of the individuals in the testing subset; and the server receives tested individuals from the at least one client device, a first subset of at least one of the received tested individuals being different from all of the individuals previously delegated by the server, each tested individual being received in association with an indication of its performance during testing by the at least one client device and at least the tested individuals in the first subset also being received in association with an indication of its ancestry count.

28. The data mining method of claim 27, wherein the selecting of individuals for discarding selects individuals for discarding further in dependence upon their respective ancestry counts, such that when selecting individuals for discarding, their respective client-centric overall fitness estimates are handicapped in dependence upon their respective ancestry counts.

* * * * *